US011722261B2

(12) United States Patent
Matsuda et al.

(10) Patent No.: US 11,722,261 B2
(45) Date of Patent: Aug. 8, 2023

(54) COMMUNICATION APPARATUS AND COMMUNICATION METHOD

(71) Applicant: Sony Group Corporation, Tokyo (JP)

(72) Inventors: Hiroki Matsuda, Tokyo (JP); Kazuyuki Shimezawa, Kanagawa (JP); Naoki Kusashima, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 61 days.

(21) Appl. No.: 17/406,092

(22) Filed: Aug. 19, 2021

(65) Prior Publication Data

US 2021/0385025 A1  Dec. 9, 2021

Related U.S. Application Data

(63) Continuation of application No. 16/608,190, filed as application No. PCT/JP2018/009515 on Mar. 12, 2018, now Pat. No. 11,121,826.

(30) Foreign Application Priority Data

May 2, 2017  (JP) ................................. 2017-091538

(51) Int. Cl.
*H04L 1/1812* (2023.01)
*H04L 1/00* (2006.01)
*H04W 28/04* (2009.01)
*H04W 72/12* (2023.01)

(52) U.S. Cl.
CPC .......... *H04L 1/1819* (2013.01); *H04L 1/0003* (2013.01); *H04W 28/04* (2013.01); *H04W 72/12* (2013.01)

(58) Field of Classification Search
None
See application file for complete search history.

(56) References Cited

U.S. PATENT DOCUMENTS

| 11,121,826 B2* | 9/2021 | Matsuda | H04W 28/04 |
| 2010/0215007 A1* | 8/2010 | Zhang | H04L 5/0007 370/329 |

(Continued)

FOREIGN PATENT DOCUMENTS

| CN | 102714580 A | 10/2012 |
| JP | 2007-325115 A | 12/2007 |

(Continued)

OTHER PUBLICATIONS

International Search Report and Written Opinion dated May 15, 2018 for PCT/JP2018/009515 filed on Mar. 12, 2018, 12 pages.

(Continued)

*Primary Examiner* — Hong S Cho
(74) *Attorney, Agent, or Firm* — Xsensus LLP

(57) ABSTRACT

[Subject]
To make flexible design according to a use case possible and further improve the transmission efficiency of the entire system.
[Solving Means]
A communication apparatus includes a communication section configured to perform wireless communication, and a control section configured to control such that information corresponding to a plurality of one-encoding units to be made a target of re-transmission is notified to another apparatus, the target of re-transmission being, from among one or a plurality of one-encoding units defined so as to include at least part of a plurality of one-encoding units included in a predetermined transmission unit, any of the plurality of one-encoding units whose reception results in failure and all of the plurality of one-encoding units included in the predetermined transmission unit.

9 Claims, 19 Drawing Sheets

(56) References Cited

U.S. PATENT DOCUMENTS

| | | | | |
|---|---|---|---|---|
| 2017/0026297 A1* | 1/2017 | Sun | .......................... | H04L 47/25 |
| 2019/0363833 A1* | 11/2019 | Wang | ..................... | H04L 1/1819 |
| 2020/0036482 A1* | 1/2020 | Park | ...................... | H04L 1/1812 |
| 2020/0374043 A1* | 11/2020 | Lei | ..................... | H04W 72/0413 |

FOREIGN PATENT DOCUMENTS

| | | |
|---|---|---|
| JP | 2010-147755 A | 7/2010 |
| JP | 2012-99907 A | 5/2012 |
| WO | 2010/113214 A1 | 10/2010 |
| WO | 2017/221871 A1 | 12/2017 |

OTHER PUBLICATIONS

Ericsson, "On Protocol Impacts of Code Block Group Based HARQ-ACK Feedback", 3GPP TSG-RAN WG1 Meeting No. 88bis, R1-1706049, Spokane, U.S., Apr. 3-7, 2017, pp. 1-3.

HTC: "On HARQ-ACK feedback for NR", 3GPP Draft; R1-1705660 on HARQ-ACK Feedback for NR, 3rd Generation Partnership Project (3GPP), Mobile Competence Centre; 650 Route Des Lucioles; F-06921 Sophia-Antipolis Cedex; France, vol. RAN WG1, No. Spokane, USA; Apr. 3, 2017-Apr. 7, 2017 Apr. 2, 2017 (Apr. 2, 2017), Retrieved from the Internet: URL: http://www.3gpp.org/ftp/Meetings_3GPP_SYNC/RAN1/Docs/ [retrieved on Apr. 2, 2017].

LG Electronics: "Discussion on CB group based HARQ operation", 3GPP Draft; R1-1704916 NR CBG Harq_Final, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Apr. 2, 2017 (Apr. 2, 2017), Retrieved from the Internet: URL: http://www.3gpp.org/ftp/Meetings_3GPP_SYNC/RAN1 /Docs/, [retrieved on Apr. 2, 2017].

Partial Supplemental European Search Report dated Apr. 16, 2020 in European Application No. 18795157.9.

\* cited by examiner

COMMUNICATION APPARATUS AND COMMUNICATION METHOD

CROSS-REFERENCE TO RELATED APPLICATIONS

The present application is a continuation of U.S. application Ser. No. 16/608,190, filed Oct. 25, 2019, which is based on PCT filing PCT/JP2018/009515, filed Mar. 12, 2018, which claims priority to JP 2017-091538, filed May 2, 2017, the entire contents of each are incorporated herein by its reference.

TECHNICAL FIELD

The present disclosure relates to a communication apparatus and a communication method.

BACKGROUND ART

A wireless access method and a wireless network of cellular mobile communication (hereafter referred to also as "Long Term Evolution (LTE)," "LTE-Advanced (LTE-A)," "LTE-Advanced Pro (LTE-A Pro)," "New Radio (NR)," "New Radio Access Technology (NRAT)," "Evolved Universal Terrestrial Radio Access (EUTRA)" or "Further EUTRA (FEUTRA)") are examined in the 3rd Generation Partnership Project (3GPP). It is to be noted that, in the following description, LTE includes LTE-A, LTE-A Pro and EUTRA, and NR includes fifth generation mobile wireless communication (5G), NRAT and FEUTRA. In LTE and NR, a base station apparatus (base station) is also called eNodeB (evolved NodeB), and a terminal apparatus (mobile station, mobile station apparatus, terminal) is also called UE (User Equipment). LTE and NR are cellular communication systems in which a plurality of areas each covered by a base station apparatus is disposed cellularly. A single base station apparatus may manage a plurality of cells.

NR is a RAT (Radio Access Technology) different from LTE as a wireless access method of the next generation for LTE. NR is an access technology compatible with various use cases including eMBB (Enhanced mobile broadband), mMTC (Massive machine type communications) and URLLC (Ultra reliable and low latency communications). NR is examined aiming at a technical framework compatible with utilization scenarios, requirements, deployment scenarios and so forth in such use cases. One of technologies examined by NR is a Control Block (CB) Group Based re-transmission technology. This is a technology of dividing one transmission block into a plurality of blocks and retransmitting the transmission block in a unit of a block after the division, and details of this are disclosed in NPL 1.

CITATION LIST

Non Patent Literature

[NPT 1]
3GPP, RAN1, R1-1706049, Ericsson, "On Protocol Impacts of Code Block Group Based HARQ-ACK Feedback," April, 2017.

SUMMARY

Technical Problem

On the other hand, in NR, utilization in various use cases is supposed, and a contrivance that makes flexible design according a use case possible is demanded. From such a background as just described, it is demanded to provide a technology by which, even in such a situation in which CB group re-transmission is performed, operation relating to the CB group re-transmission can be controlled more flexibly and eventually the transmission efficiency of the entire system can be further improved.

Therefore, the present disclosure proposes a technology that makes flexible design according to a use case possible and can further improve the transmission efficiency of the entire system.

According to the present disclosure, there is provided a communication apparatus including: a communication section configured to perform wireless communication; and a control section configured to control such that information corresponding to a plurality of one-encoding units to be made a target of re-transmission is notified to another apparatus, the target of re-transmission being, from among one or a plurality of one-encoding units defined so as to include at least part of a plurality of one-encoding units included in a predetermined transmission unit, any of the plurality of one-encoding units whose reception results in failure and all of the plurality of one-encoding units included in the predetermined transmission unit.

Further, according to the present disclosure, there is provided a communication apparatus including: a communication section configured to perform wireless communication; and a control section configured to control, in response to a reply to transmission of data to another apparatus, such that at least part of a plurality of one-encoding units, from among one or a plurality of one-encoding units defined so as to include at least part of a plurality of one-encoding units included in a predetermined transmission unit, is re-transmitted to the another apparatus. The control section controls such that information for allowing the another apparatus to specify the plurality of one-encoding units to be made a target of re-transmission is notified to the another apparatus.

Further, according to the present disclosure, there is provided a communication apparatus including: a communication section configured to perform wireless communication; and a control section configured to control, targeting, from among one or a plurality of one-encoding units defined so as to include at least part of a plurality of one-encoding units included in a predetermined transmission unit, at least part of the plurality of one-encoding units transmitted from another apparatus, such that a reply according to a result of reception of the plurality of one-encoding units is notified to the another apparatus.

Further, according to the present disclosure, there is provided a communication method performed by a computer, including: performing wireless communication; and controlling such that information regarding, from among one or a plurality of one-encoding units defined so as to include at least part of a plurality of one-encoding units included in a predetermined transmission unit, the plurality of one-encoding units to be made a target of re-transmission is notified to another apparatus.

Further, according to the present disclosure, there is provided a communication method performed by a computer, including: performing wireless communication; and controlling, in response to a reply to transmission of data to another apparatus, such that at least part of a plurality of one-encoding units, from among one or a plurality of one-encoding units defined so as to include at least part of a plurality of one-encoding units included in a predetermined transmission unit, is re-transmitted to the another apparatus. Information for allowing the another apparatus to specify the plurality of one-encoding units to be made a target of re-transmission is controlled so as to be notified to the another apparatus.

Further, according to the present disclosure, there is provided a communication method performed by a computer, including: performing wireless communication; and controlling, targeting, from among one or a plurality of one-encoding units defined so as to include at least part of a plurality of one-encoding units included in a predetermined transmission unit, at least part of the plurality of one-encoding units transmitted from another apparatus, such that a reply according to a result of reception of the plurality of one-encoding units is notified to the another apparatus.

Advantageous Effect of Invention

A described above, according to the present disclosure, a technology is provided which makes flexible design according to a use case possible and can further improve the transmission efficiency of the entire system.

It is to be noted that the effect described above is not necessarily restrictive, and some effects indicated in the present specification or other effects that can be recognized from the present specification may be applicable together with the effect described above or in place of the effect described above.

DESCRIPTION OF EMBODIMENT

In the following, a preferred embodiment of the present disclosure is described with reference to the drawings. It is to be noted that, in the present specification and the drawings, components having the substantially same functional configuration are denoted by like reference signs and overlapping description of them is omitted.

It is to be noted that the description is given in accordance with the following items.

1. Example of Configuration
1.1. Example of System Configuration
1.2. Example of Configuration of Base Station
1.3. Example of Configuration of Terminal Apparatus
2. Technological Feature
2.1. Code Block Group (CBG)
2.2. CBG-based HARQ-ACK
2.3. Transmission of CBG in Downlink Transmission
2.4. HARQ-ACK Transmission Means for Downlink Transmitted CBG
2.5. CBG Transmission Means in Uplink Transmission
2.6. HARQ-ACK Transmission Means for Uplink Transmitted CBG
2.7. Supplement
3. Application Example
3.1. Application Example Relating to Base Station
3.2. Application Example Relating to Terminal Apparatus
4. Conclusion 1. Example of Configuration <1.1. Example of System Configuration>

Figure 1:
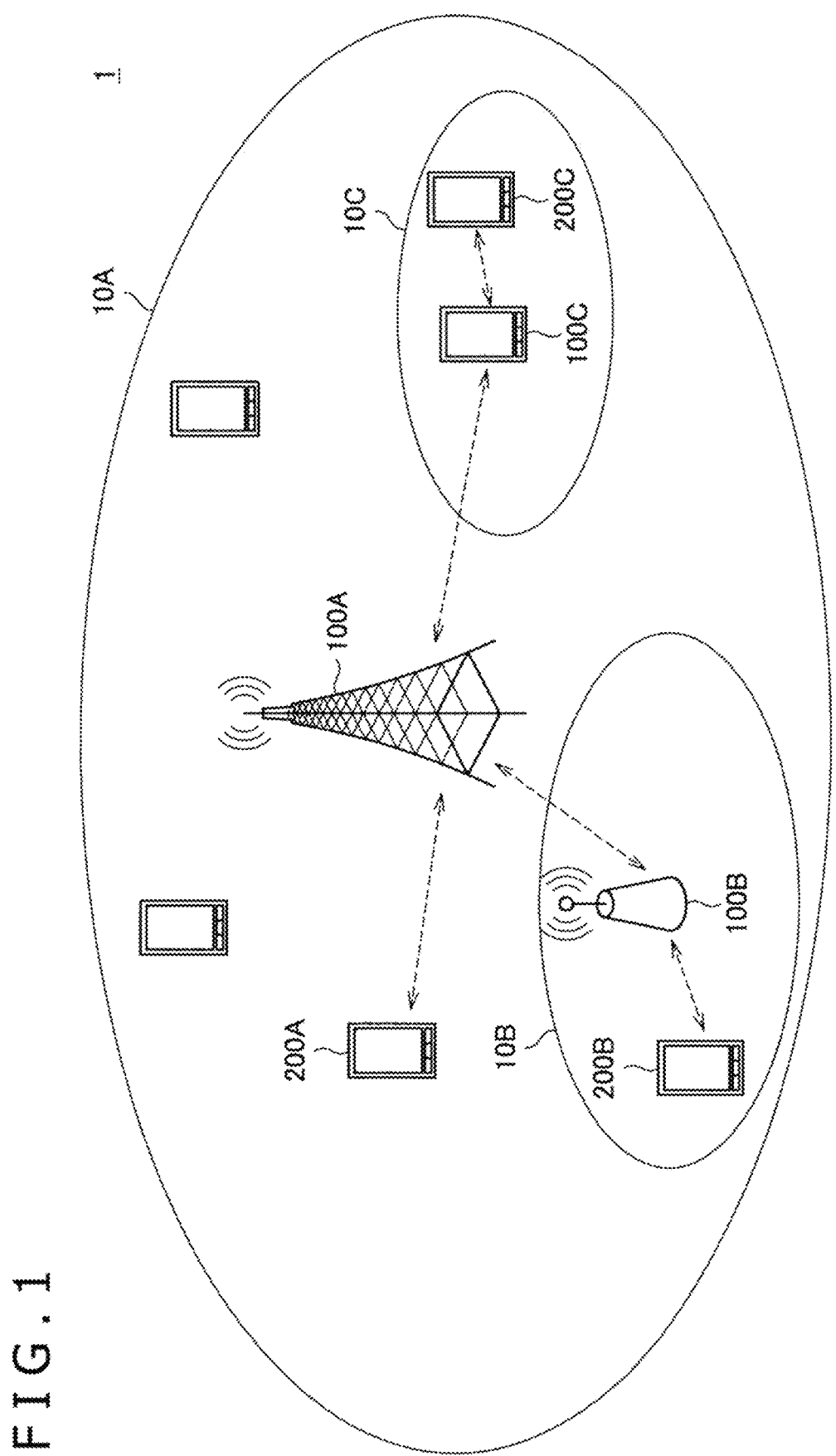
FIG. 1 is an explanatory view illustrating an example of a schematic configuration of a system 1 according to an embodiment of the present disclosure.

First, an example of a schematic configuration of a system 1 according to an embodiment of the present disclosure is described with reference to FIG. 1. FIG. 1 is an explanatory view illustrating an example of a schematic configuration of the system 1 according the embodiment of the present disclosure. As depicted in FIG. 1, the system 1 includes a wireless communication apparatus 100 and a terminal apparatus 200. Here, the terminal apparatus 200 is called also user. The user can be called also UE. A wireless communication apparatus 100C is called also UE-Relay. The UE here may be a UE defined in LTE or LTE-A, and UE-Relay may be Prose UE to Network Relay discussed in 3GPP or, more generally, may signify communication equipment.

(1) Wireless Communication Apparatus 100

The wireless communication apparatus 100 is an apparatus that provides a wireless communication service to subordinate apparatus. For example, a wireless communication apparatus 100A is a base station of a cellular system (or a mobile communication system). The base station 100A performs wireless communication with an apparatus positioned in the inside of a cell 10A of the base station 100A (for example, a terminal apparatus 200A). For example, the base station 100A transmits a downlink signal to the terminal apparatus 200A and receives an uplink signal from the terminal apparatus 200A.

The base station 100A is logically connected to another base station, for example, by an X2 interface and can transmit and receive control information and so forth. Further, the base station 100A is logically connected to a so-called core network (not depicted), for example, by an S1 interface and can transmit and receive control information and so forth. It is to be noted that communication between such apparatuses can be relayed physically by various apparatus.

Here, the wireless communication apparatus 100A depicted in FIG. 1 is a macro cell base station, and the cell 10A is a macro cell. Meanwhile, the wireless communication apparatus 100B and 100C are master devices that operate small cells 10B and 10C, respectively. As an example, the master device 100B is a small cell base station installed fixedly. The small cell base station 100B cooperates with the macro cell base station 100A to establish a wireless backhaul link and cooperates with one or more terminal apparatuses in the small cell 10B (for example, a terminal apparatus 200B) to establish an access link. It is to be noted that the wireless communication apparatus 100B may be a relay node defined by 3GPP. The master device 100C is a dynamic AP (access point). The dynamic AP 100C is a mobile device that dynamically operates the small cell 10C. The dynamic AP 100C cooperates with the macro cell base station 100A to establish a wireless backhaul link and cooperates with one or more terminal apparatuses in the small cell 10C (for example, a terminal apparatus 200C). The dynamic AP 100C may be, for example, a terminal apparatus in which hardware or software that can operate as a base station or a wireless access point is incorporated. The small cell 10C in this case is a local network (Localized Network/Virtual Cell) formed dynamically.

The cell 10A may be operated in accordance with an arbitrary wireless communication method such as, for example, LTE, LTE-A (LTE-Advanced), LTE-ADVANCED PRO, GSM (registered trademark), UMTS, W-CDMA, CDMA2000, WiMAX, WiMAX2 or IEEE802.16.

It is to be noted that the small cell is a concept that can include various kinds of cells that are deployed in an overlapping relationship or without overlapping with a macro cell and are smaller than a macro cell (for example, a femtocell, a nanocell, a picocell, a microcell and so forth). In a certain example, the small cell is operated by a base station for exclusive use. In another example, the small cell is operated by a terminal serving as a master device, which temporarily operates as a small cell base station. Also a so-called relay node can be regarded as a form of a small cell base station. A wireless communication apparatus that functions as a master station of a relay node is called also donor base station. A donor base station may signify DeNB in LTE or may more generally signify a master station of a relay node.

(2) Terminal Apparatus 200

The terminal apparatus 200 is communicatable in a cellular system (or a mobile communication system). The terminal apparatus 200 performs wireless communication with a wireless communication apparatus of a cellular system (for example, the base station 100A or the master device 100B or 100C). For example, the terminal apparatus 200A receives a downlink signal from the base station 100A and transmits an uplink signal to the base station 100A.

Further, as the terminal apparatus 200, not only a so-called UE, but also a so-called low cost terminal (Low cost UE) such as, for example, an MTC terminal, an eMTC (Enhanced MTC) terminal or an NB-IoT terminal may be applied.

(3) Supplement

While, in the foregoing, a schematic configuration of the system 1 has been exemplified, the present technology is not limited to the example depicted in FIG. 1. For example, as the configuration of the system 1, a configuration that does not include a master device, SCE (Small Cell Enhancement), HetNet (Heterogeneous Network), an MTC network and so forth can be adopted. As another example of the configuration of the system 1, a master device may be connected to a small cell while a cell is constructed under the small cell.

<1.2. Example of Configuration of Base Station>

Figure 2:
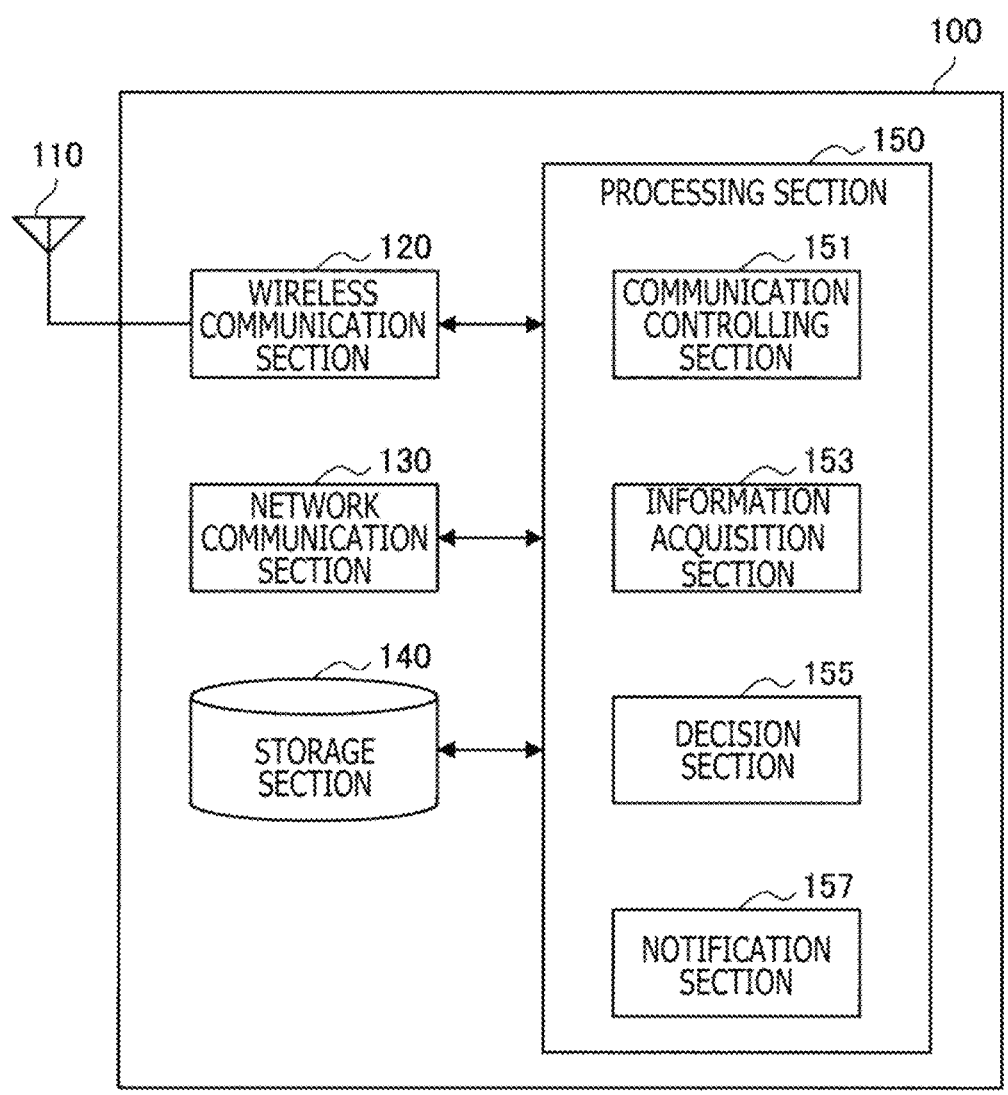
FIG. 2 is a block diagram depicting an example of a configuration of a base station according to the embodiment.

Now, a configuration of the base station 100 according to the embodiment of the present disclosure with reference to FIG. 2. FIG. 2 is a block diagram depicting an example of a configuration of the base station 100 according to the embodiment of the present disclosure. Referring to FIG. 2, the base station 100 includes an antenna section 110, a wireless communication section 120, a network communication section 130, a storage section 140 and a processing section 150.

(1) Antenna Section 110

The antenna section 110 radiates a signal outputted from the wireless communication section 120 as a radio wave into the space. Further, the antenna section 110 converts a radio wave in the space into a signal and outputs the signal to the wireless communication section 120.

(2) Wireless Communication Section 120

The wireless communication section 120 transmits and receives a signal. For example, the wireless communication section 120 transmits a downlink signal to a terminal apparatus and receives an uplink signal from a terminal apparatus.

Further, as described hereinabove, in the system 1 according to the present embodiment, a terminal apparatus operates as a relay terminal (wireless communication apparatus 100C in FIG. 1) and sometimes relays communication between a remote terminal (the terminal apparatus 200C in FIG. 1) and a base station. In such a case as just described, for example, the wireless communication section 120 in the wireless communication apparatus 100C that corresponds to a relay terminal may transmit and receive a side link signal to and from the remote terminal.

(3) Network Communication Section 130

The network communication section 130 transmits and receives information. For example, the network communication section 130 transmits information to another node and receives information from the another node. For example, the another node includes another base station and a core network node.

It is to be noted that, as described hereinabove, in the system 1 according to the present embodiment, a terminal apparatus sometimes operates as a relay terminal and relays communication between a remote terminal and a base station. In such a case as just described, for example, the wireless communication apparatus 100C that corresponds to the relay terminal may not include the network communication section 130.

(4) Storage Section 140

The storage section 140 temporarily or permanently stores programs and various kinds of data for operation of the base station 100.

(5) Processing Section 150

The processing section 150 provides various functions of the base station 100. The processing section 150 includes a communication controlling section 151, an information acquisition section 153, a decision section 155 and a notification section 157. It is to be noted that the processing section 150 can further include other components than the components mentioned. In other words, the processing section 150 can perform operations other than operations of the components. It is to be noted that the processing section 150 corresponds to an example of a "control section" in the base station 100.

Operation of the communication controlling section 151, information acquisition section 153, decision section 155 and notification section 157 is hereinafter described in detail.

<1.3. Example of Configuration of Terminal Apparatus>

Figure 3:
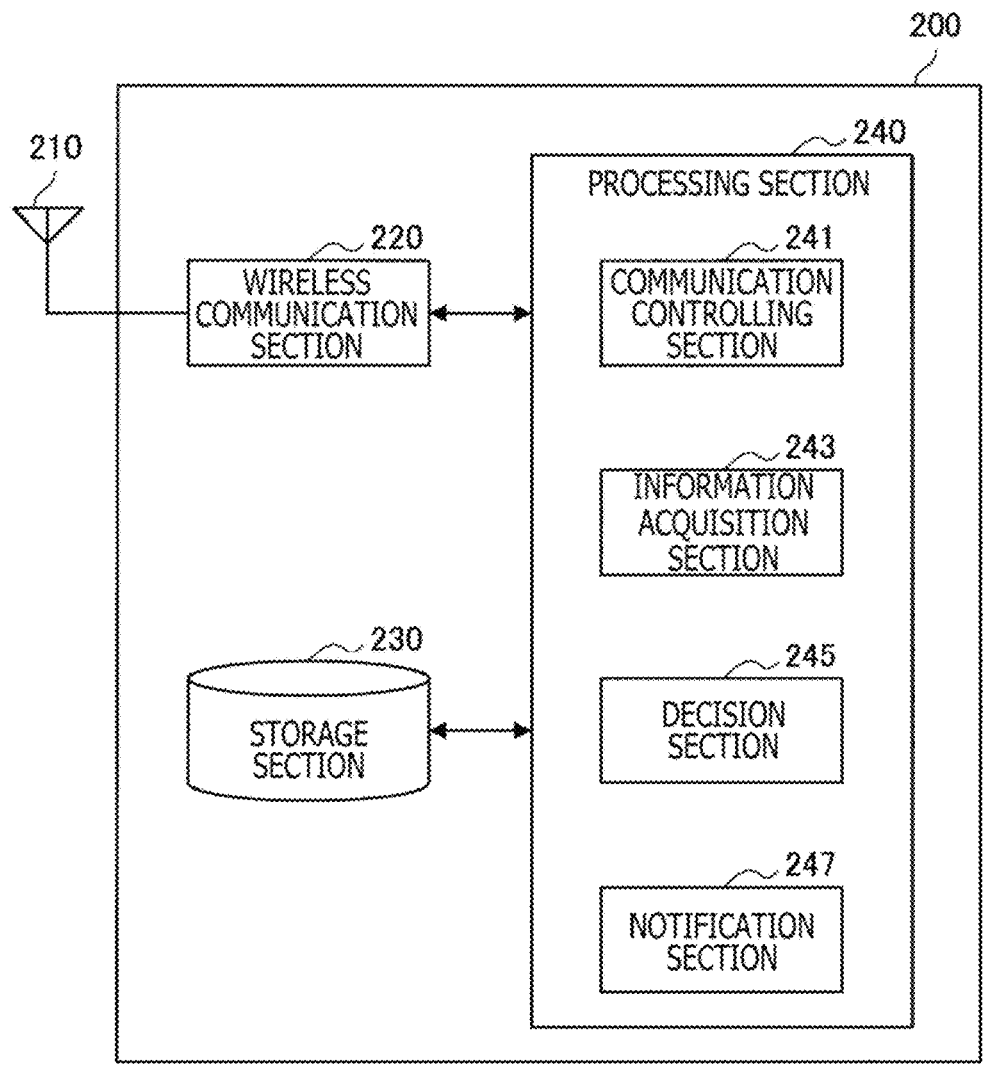
FIG. 3 is a block diagram depicting an example of a configuration of a terminal apparatus according to the embodiment.

Now, an example of a configuration of the terminal apparatus 200 according to the embodiment of the present disclosure is described with reference to FIG. 3. FIG. 3 is a block diagram depicting an example of a configuration of the terminal apparatus 200 according one embodiment of the present disclosure. As depicted in FIG. 3, the terminal apparatus 200 includes an antenna section 210, a wireless communication section 220, a storage section 230 and a processing section 240.

(1) Antenna Section 210

The antenna section 210 radiates a signal outputted from the wireless communication section 220 as a radio wave into the space. Further, the antenna section 210 converts a radio wave in the space into a signal and outputs the signal to the wireless communication section 220.

(2) Wireless Communication Section 220

The wireless communication section 220 transmits and receives a signal. For example, the wireless communication section 220 receives a downlink signal from a base station and transmits an uplink signal to the base station.

Further, as described above, in the system 1 according to the present embodiment, a terminal apparatus sometimes operates as a relay terminal and relays communication between a remote terminal and a base station. In such a case as just described, for example, the wireless communication section 220 in the terminal apparatus 200C that operates as the remote terminal may transmit and receive a side link signal to and from the relay terminal.

(3) Storage Section 230

The storage section 230 temporarily or permanently stores programs and various kinds of data for operation of the terminal apparatus 200.

(4) Processing Section 240

The processing section 240 provides various functions of the terminal apparatus 200. For example, the processing section 240 includes a communication controlling section 241, an information acquisition section 243, a decision section 245 and a notification section 247. It is to be noted that the processing section 240 can further include components other than the components mentioned. In other words, the processing section 240 can perform operations other than operations of the components mentioned. It is to be noted that the processing section 240 corresponds to an example of a "control section" in the terminal apparatus 200.

Operation of the communication controlling section 241, information acquisition section 243, decision section 245 and notification section 247 is hereinafter described in detail.

2. Technical Feature

Now, technical features of the system according to the embodiment of the present disclosure are described.

<2.1. Code Block Group (CBG)>

Figure 4:
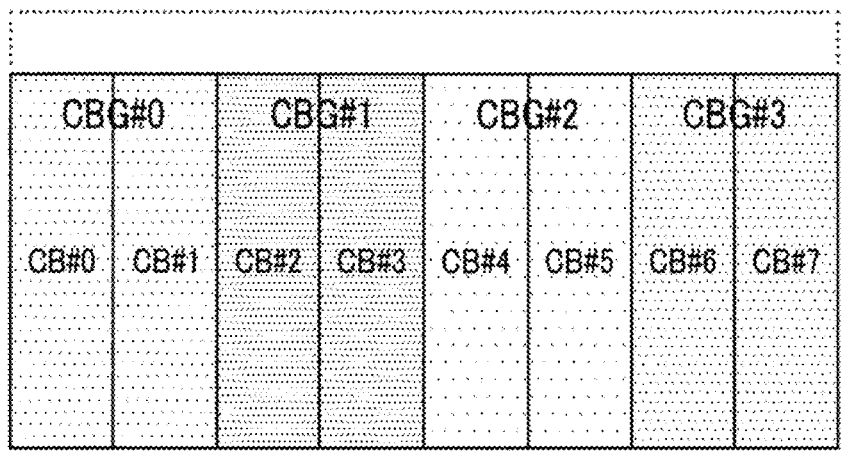
FIG. 4 is an explanatory view illustrating an overview of CBs.
Figure 5:
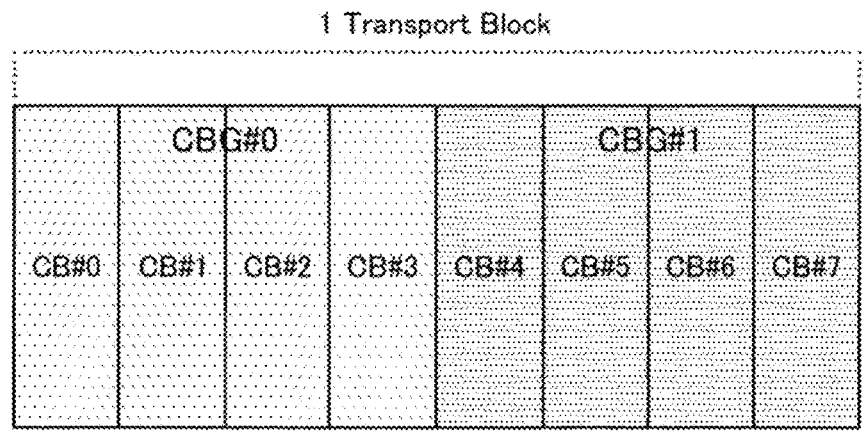
FIG. 5 is an explanatory view illustrating another overview of CBs.
Figure 6:
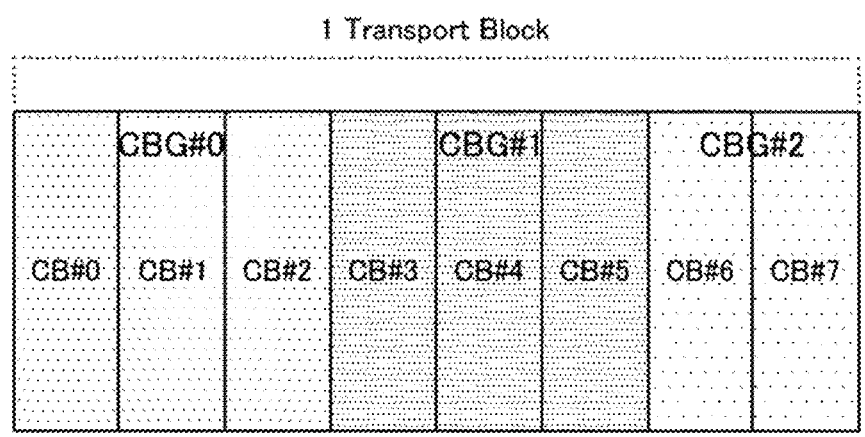
FIG. 6 is an explanatory view illustrating a further overview of CBs.
Figure 7:
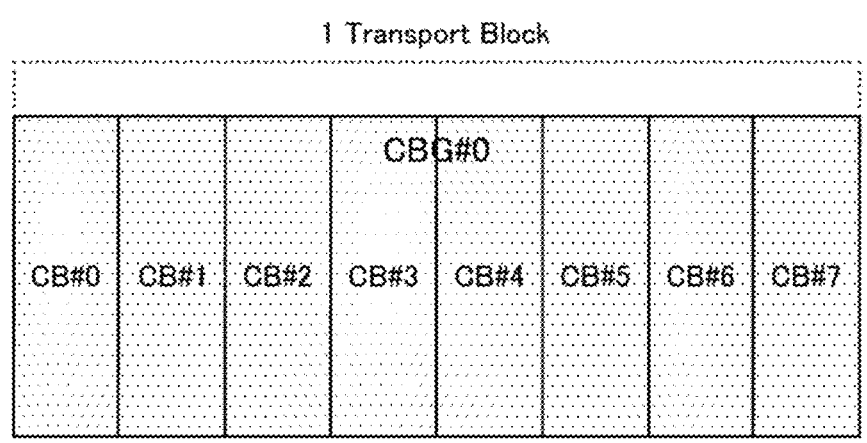
FIG. 7 is an explanatory view illustrating a still further overview of CBs.

First, an outline of a CBG (Code Block Group) is described. The CBG indicates a Group when one or a plurality of CBs (Code Blocks) is grouped into several Groups. For example, FIGS. 4 to 7 are explanatory views illustrating an overview of CBs. For example, it is assumed that one TB (Transport Block) includes eight CBs as depicted in FIG. 4. It is to be noted that a TB corresponds to a "predetermined transmission unit," and, for example, transmission or the like of data can be performed in a unit of a TB. Meanwhile, a CB corresponds to "one-encoding unit," and, for example, an encoding process, a modulation process and so forth can be performed in a unit of a CB. A CBG corresponds to a Group when one or a plurality of such CBs is grouped into one or a plurality of Groups. In other words, it can be considered that a CBG corresponds to "a plurality one-encoding units." As a more particular example, FIG. 4 depicts an example of a case in which eight CBs included in one TB are grouped for each two CBs into four CBGs. Similarly, FIG. 5 depicts an example of a case in which eight CBs included in one TB are grouped for each four CBs into two CBGs. Further, a CBG need not be grouped equally. As a particular example, as depicted in FIG. 6, CBGs may be defined such that each of CBG #0 and CBG #1 includes three CBs and CBG #2 includes two CBs. Further, as depicted in FIG. 7, a CBG may be defined such that it includes all CBs included in one TB. It is to be noted that the number of CBGs included in one TB or the number of CBs included in one CBG may be controlled quasi-statically or dynamically. In particular, information relating to the number of CBGs included in one TB or the number of CBs included in one CBG may be notified quasi-statically, for example, on the basis of RRC Signaling, System Information or the like or may be notified dynamically on the basis of DCI or the like. It is to be noted that the relationship among a TB, a CB and a CBG are merely one example and does not necessarily restrict the technology relating to the present disclosure. In other words, a different transmission unit may be applied in place of a TB. Further, a different encoding unit may be applied in place of a CB, and a concept including a plurality of such different encoding units may be defined in place of a CBG. It is to be noted that, in the following description, cases in which a TB, a CB and a CBG are applied are described as examples.

<2.2. CBG-based HARQ-ACK>

Now, CBG-based HARQ-ACK is described. CBG-based HARQ-ACK is a technology for carrying out re-transmission based on a CBG. CBG-based HARQ-ACK makes it possible to perform such control that, for example, in the case where one TB includes four CBGs, CBG #0 to CBG #3, only CBG #0 and CBG #1 among them are re-transmitted. By this, such effects as reduction of resources to be used for transmission and improvement in reliability by reduction of the code rate are expected. In the case where re-transmission based on a CBG is to be carried out, for example, it is conceivable to feed back HARQ-ACK in regard to each of CBGs included in one TB. Conventionally, the HARQ-ACK is fed back for one TB. In contrast, according to CBG-based HARQ-ACK, it is possible to feed back HARQ-ACK for each of a plurality of CBGs included in the TB. Therefore, in the case where CBG-based HARQ-ACK is applied, it is conceivable to perform HARQ-ACK feedback with a plurality of bits. As a particular example, in the case where one TB includes four CBGs, such control is conceivable as to carry out HARQ-ACK feedback using four bits.

<2.3. Transmission of CBG in Downlink Transmission>

Now, an example of a contrivance relating to transmission of a CBG in downlink transmission is described. As described hereinabove, according to CBG-based HARQ-ACK, in the case where re-transmission occurs, since also such control as to re-transmit only a CBG failed to receive is possible, it is important how a CBG is to be transmitted. Therefore, transmission means of a CBG is described separately in working examples 1-1 to 1-6 in regard to an example of the case where downlink is assumed.

Working Example 1-1: CBG of Target of Transmission is Notified

Figure 8:
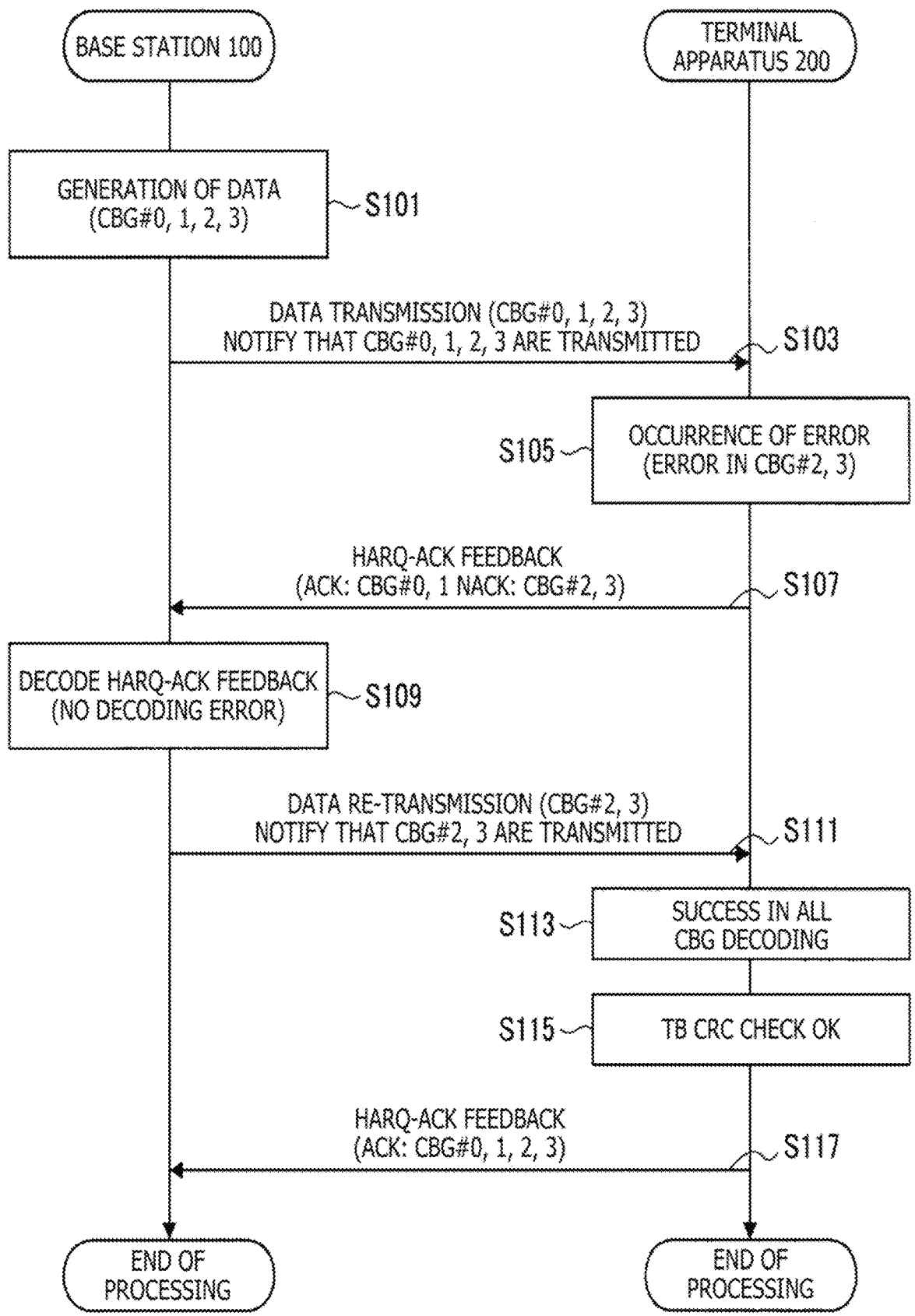
FIG. 8 is a schematic sequence diagram depicting an example of a flow of a series of processes of a system according to a working example 1-1.

First, as the working example 1-1, an example of a method in which a CBG to be made a target of transmission is notified by, for example, DCI or the like is described. For example, FIG. 8 is a schematic sequence diagram depicting an example of a flow of a series of processes of the system according to the working example 1-1. It is to be noted that, in the following description, it is assumed that one TB includes CBG #0 to CBG #3.

In the example depicted in FIG. 8, if data to be made a transmission target is generated, then the base station 100 (communication controlling section 151) carries out predetermined processes such as encoding of the data for each CB and groups the CBs into CBG #0 to CBG #3 according to communication settings (S101). Then, the base station 100 (communication controlling section 151) transmits the target data (CBG #0 to CBG #3) to a terminal apparatus 200 of a transmission destination. Further, at this time, the base station 100 notifies the terminal apparatus 200 that CBG #0, CBG #1, CBG #2 and CBG #3 are transmitted by control information such as DCI (S103).

The terminal apparatus 200 (communication controlling section 241) receives the data (CBG #0 to CBG #3) transmitted from the base station 100 and decodes the received data. At this time, the terminal apparatus 200 recognizes, on the basis of the notification by the control information such as DCI from the base station 100, that the CBG #0, CBG #1, CBG #2 and CBG #3 are transmitted. Further, the terminal apparatus 200 (decision section 245) decides, on the basis of an error detection code such as a CRC, whether or not each of the received CBGs is successfully decoded correctly. Here, it is assumed that an error occurs upon decoding of the data and the terminal apparatus 200 fails to decode CBG #2 and CBG #3 correctly (S105). The terminal apparatus 200 (notification section 247) performs HARQ-ACK feedback to the base station 100 in response to a result of the decision (S107). In this case, the terminal apparatus 200 feeds back ACK in regard to CBG #0 and CBG #1 but feeds back NACK in regard to CBG #2 and CBG #3 to the base station 100.

The base station 100 (information acquisition section 153) acquires the HARQ-ACK feedback as a reply to the data transmitted from the terminal apparatus 200. Further, at this time, the base station 100 (communication controlling section 151) may decode the HARQ-ACK feedback and decide, on the basis of the error detection code such as a CRC, whether or not the HARQ-ACK feedback is successfully decoded correctly. Here, it is assumed that the HARQ-ACK feedback is decoded correctly (S109).

Then, the base station 100 (communication controlling section 151) re-transmits the CBGs that the terminal apparatus 200 fails to decode on the basis of the HARQ-ACK feedback from the terminal apparatus 200. Here, since NACK has been fed back in regard to CBG #2 and CBG #3, the base station 100 re-transmits CBG #2 and CBG #3 to the terminal apparatus 200 and notifies the terminal apparatus 200 by control information such as DCI that CBG #2 and CBG #3 are re-transmitted (S111).

The terminal apparatus 200 (communication controlling section 241) receives the data (CBG #2 and CBG #3) re-transmitted from the base station 100 and decodes the received data. At this time, the terminal apparatus 200 recognizes, on the basis of the notification by the control information such as DCI from the base station 100, that CBG #2 and CBG #3 are transmitted. Further, it is assumed here that decoding of re-transmitted CBG #2 and CBG #3 results in success and, as a result, decoding for each CBG results in success in regard to all of CBG #0, CBG #1, CBG #2 and CBG #3 (S113). The terminal apparatus 200 (decision section 245) decides, on the basis of the error detection code such as a CRC, whether or not the TB is successfully decoded correctly. Here, it is assumed that the TB is decoded correctly (S115). The terminal apparatus 200 (notification section 247) performs HARQ-ACK feedback to the base station 100 in response to a result of the decision (S117). In this case, the terminal apparatus 200 feeds back ACK in regard to CBG #0, CBG #1, CBG #2 and CBG #3 to the base station 100.

It is to be noted that, in the example depicted in FIG. 8, the base station 100 notifies the terminal apparatus 200 of the CBGs to be made a target of transmission or re-transmission from among CBG #0 to CBG #3 included in the TB by the control information such as DCI as described hereinabove. As a particular example, in the case where the base station 100 transmits only CBG #0 and CBG #1 and does not transmit CBG #2 and CBG #3, it notifies the terminal apparatus 200 of such control information as (0, 0, 1, 1). The example here indicates CBGs that become a target of transmission or re-transmission by a bit series corresponding to CBGs like (CBG #3, CBG #2, CBG #1, CBG #0), and it is indicated that a CBG corresponding to the bit of 1 is transmitted. It is to be noted that 0 and 1 may have meanings opposite to those just described. By notification performed in this manner, it becomes possible for the terminal apparatus 200 to recognize which CBG is transmitted.

On the other hand, in the present working example, since information such as a bit series described above must be included into control information such as DCI, the information amount of control information increases. Further, as described with reference to FIGS. 4 to 7, also it is possible to dynamically change the size of CBGs, and in this case, since it is considered that also the size of control information changes dynamically, increase of the number of times of blind decoding of DCI is concerned. In contrast, also it is conceivable to apply padding bits to control information such as DCI in order that the number of times of blind decoding does not change.

For example, in the case where it is assumed that the maximum CBG size in specification is 8, an area of 8 bits like (CBG #7, CBG #6, CBG #5, CBG #4, CBG #3, CBG #2, CBG #1, CBG #0) is prepared for control information.

In the case where the CBG size set under such assumption is 4, padding bits are applied to and transmitted together with bits of CBG #7 to CBG #4. Further, in the case where the CBG size set upon first time transmission is 4 and the CBG number to be transmitted upon re-transmission is 2, to the bits of the other CBGs whose transmission results in success upon first time transmission, padding bits are applied. However, since the technique just described transmits bits that do not have information, deterioration of the transmission resource utilization efficiency is concerned.

Figure 9:
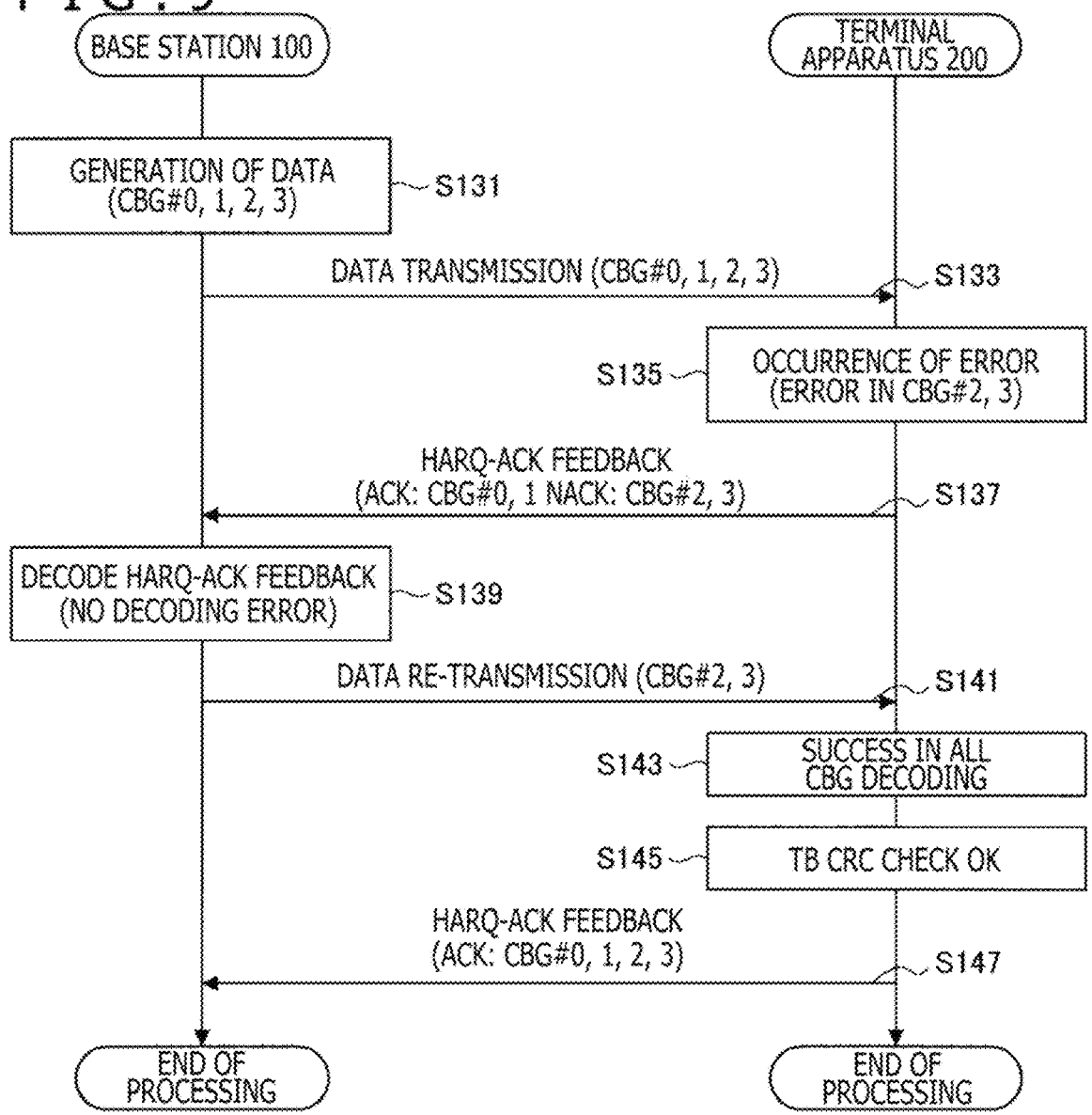
FIG. 9 is a schematic sequence diagram depicting an example of a flow of a series of processes of a system according to a working example 1-2.

Working Example 1-2: Determined on the Basis of ACK/NACK Upon Preceding Time Transmission Now, an example of a method of determining CBGs upon re-transmission on the basis of a result of ACK/NACK upon preceding time transmission is described as the working example 1-2. For example, FIG. 9 is a schematic sequence diagram depicting an example of a flow of a series of processes of the system according to the working example 1-2. It is to be noted that, in the present description, it is assumed that one TB includes CBG #0 to CBG #3.

In the example depicted in FIG. 9, if data to be made a transmission target is generated, then the base station 100 (communication controlling section 151) carries out predetermined processes such as encoding for the data for each CB and groups the CBs into CBG #0 to CBG #3 according to communication settings (S131). Then, the base station 100 (communication controlling section 151) transmits the target data (CBG #0 to CBG #3) to the terminal apparatus 200 of a transmission destination. It is to be noted that, in the present working example, unlike the working example 1-1 described hereinabove, notification of a CBG that becomes a transmission target by control information such as DCI is not performed from the base station 100 to the terminal apparatus 200 (S133).

The terminal apparatus 200 (communication controlling section 241) receives the data (CBG #0 to CBG #3) transmitted from the base station 100 and decodes the received data. At this time, since the data transmitted from the base station 100 is data upon first time transmission, the terminal apparatus 200 decodes the CBGs determining that all of the CBG #0, CBG #1, CBG #2 and CBG #3 included in a TB are transmitted. Further, the terminal apparatus 200 (decision section 245) decides, on the basis of an error detection code such as a CRC, whether or not each of the received CBGs is successfully decoded correctly. Here, it is assumed that, similarly as in the example depicted in FIG. 8, an error occurs upon decoding of the data and the terminal apparatus 200 fails to decode CBG #2 and CBG #3 correctly (S135). In this case, processes denoted by reference signs S135 to S139 are similar to the processes denoted by the reference signs S105 to S109 in the example depicted in FIG. 8, and therefore, detailed description of them is omitted.

Then, the base station 100 (communication controlling section 151) re-transmits the CBGs whose decoding by the terminal apparatus 200 results in failure on the basis of HARQ-ACK feedback from the terminal apparatus 200. Here, since NACK is fed back in regard to CBG #2 and CBG #3, the base station 100 re-transmits CBG #2 and CBG #3 to the terminal apparatus 200 (S141).

The terminal apparatus 200 (communication controlling section 241) receives the data (CBG #2, CBG #3) re-transmitted from the base station 100 and decodes the received data. At this time, since the terminal apparatus 200 has notified NACK in regard to CBG #2 and CBG #3 formerly, it determines that CBG #2 and CBG #3 have been transmitted from the base station 100 and decodes the received CBGs. Further, it is assumed here that the terminal apparatus 200 succeeds in decoding of re-transmitted CBG #2 and CBG #3 and, as a result, the terminal apparatus 200 succeeds in decoding of all of CBG #0, CBG #1, CBG #2 and CBG #3 for each CBG similarly as in the case depicted in FIG. 8 (S143). In this case, processes denoted by reference signs S143 to S147 are similar to the processes denoted by the reference signs S113 to S117 in the example depicted in FIG. 8, and therefore, detailed description of them is omitted.

Figure 10:
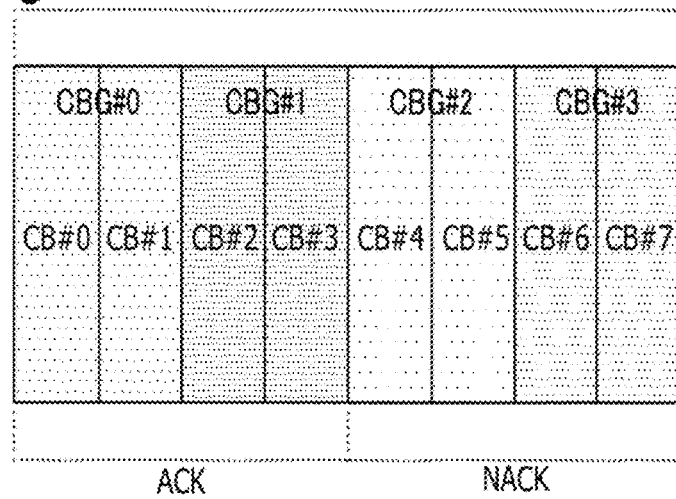
FIG. 10 is an explanatory view illustrating an overview of the system according to the working example 1-2.

Here, a system according to the working example 1-2 is examined below with reference to FIG. 10. FIG. 10 is an explanatory view illustrating an overview of the system according to the working example 1-2. In particular, in the present description, it is assumed that CBG #0 to CBG #3 are transmitted by downlink and reception of CBG #0 and CBG #1 results in success while reception of CBG #2 and CBG #3 results in failure as depicted in FIG. 10.

In the system according to the working example 1-2, as described with reference to FIG. 8, the terminal apparatus 200 performs HARQ-ACK feedback in regard to CBG #0, CBG #1, CBG #2 and CBG #3 included in a TB. Further, the base station 100 transmits, upon re-transmission, only the CBGs corresponding to NACK on the basis of a feedback result from the terminal apparatus 200 to the terminal apparatus 200. In the working example 1-2, since such an arrangement as described above is made, such transmission of control information (for example, a bit series) as indicated in the working example 1-1 becomes unnecessary, and therefore, improvement of the transmission resource utilization efficiency is expected.

Figure 11:
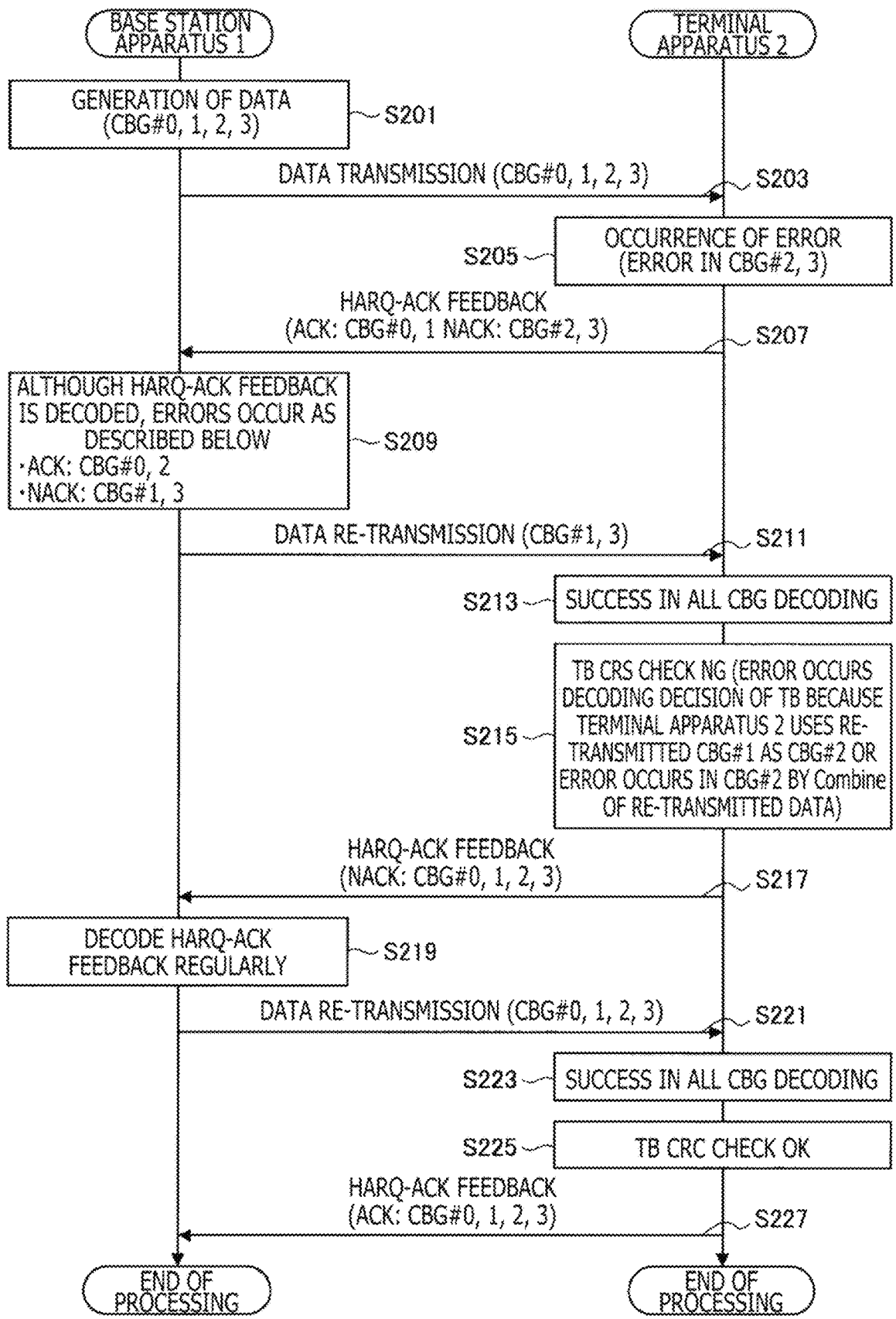
FIG. 11 is a schematic sequence diagram depicting another example of a flow of a series of processes of the system according to the working example 1-2.

On the other hand, in the case where an HARQ-ACK feedback result from the terminal apparatus 200 is decoded in error by the base station 100 or in the case where the base station 100 detects an error in decoding, there is the possibility that a problem may occur. For example, FIG. 11 is a schematic sequence diagram depicting another example of a flow of a series of processes of the system according to the working example 1-2. It is to be noted that processes denoted by reference signs S201 to S207 are similar to the processes denoted by the reference signs S131 to S137 in FIG. 9, and therefore, detailed description of them is omitted.

In the example depicted in FIG. 11, the terminal apparatus 200 notifies the base station 100 of ACK in regard to CBG #0 and CBG #1 and of NACK in regard to CBG #2 and CBG #3 (S207). It is assumed that, in response to this, although the base station 100 succeeds in decoding of the HARQ-ACK feedback itself, an error occurs in the decoding result and it is recognized by the base station 100 that ACK is notified in regard to CBG #0 and CBG #2 and NACK is notified in regard to CBG #1 and CBG #3 (S209). In this case, the base station 100 re-transmits CBG #1 and CBG #3 (S211). On the other hand, since the terminal apparatus 200 decodes, determining that CBG #2 and CBG #3 are transmitted, the re-transmission signal, a problem occurs with re-transmission of CBG #2. In particular, in the case where the terminal apparatus 200 succeeds in decoding of CBG #1, it uses the data of CBG #1 as data of CBG #2. Therefore, for example, either a data error occurs in the TB as a whole after data decoding of all CBGs results in success (S213 and S215), or decoding of CBG #2 results in failure again by combining the data of CBG #2 received upon first time transmission and the data of CBG #1 transmitted in error by re-transmission with each other. In particular, in this case, the terminal apparatus 200 feeds back NACK in regard to CBG #0, CBG #1, CBG #2 and CBG #3 to the base station 100, and re-transmission occurs newly (S219 to S227). This can make also a cause of delay.

On the other hand, also in the case where the base station 100 detects an error of a decoding result of the HARQ-ACK feedback, it is difficult for the base station 100 to find which CBG belongs to ACK/NACK. In particular, since the base station 100 does not find which CBG is to be re-transmitted, it is conceivable as a countermeasure to transmit the same CBG as that upon preceding time transmission or all CBGs.

However, since there is no means for allowing the base station 100 to notify the terminal apparatus 200 of whether a CBG same as that upon preceding time transmission is transmitted or all CBGs are transmitted, it is difficult for the terminal apparatus 200 to know which CBG is re-transmitted from the base station 100.

In this manner, in the system according to the working example 1-2, there is the possibility that such problems as described above may occur. Therefore, in the case where the system is applied to the working example 1-2, it is necessary to apply the system to an environment in which an HARQ-ACK feedback from the terminal apparatus 200 can be received correctly or to separately apply a countermeasure for preventing occurrence of a discrepancy of CBGs transmitted and received between a transmitter and a receiver.

Working Example 1-3: Determined on the Basis of all CBG Re-Transmission Bits or Preceding Time CBG Re-Transmission Bits Subsequently, an example of a technology that improves the system according to the working example 1-2 described above is described as a working example 1-3. In the present working example, an example of a contrivance of notifying the terminal apparatus 200 of a CBG of a re-transmission target by control information such as DCI in regard to all CBG re-transmission bits or preceding time CBG re-transmission bits in addition to the contrivance described hereinabove as the working example 1-2 is described.

More particularly, in the present working example, in the case where the base station 100 detects that the base station 100 fails to decode an HARQ-ACK feedback, the base station 100 selectively changes over whether all CBGs are to be re-transmitted or a CBG or CBGs same as those in preceding time transmission are to be re-transmitted. Further, the base station 100 notifies the terminal apparatus 200 of a selection result of whether all CBGs are to be re-transmitted or a CBG or CBGs same as those in preceding time transmission are to be re-transmitted through control information such as DCI.

Figure 12:
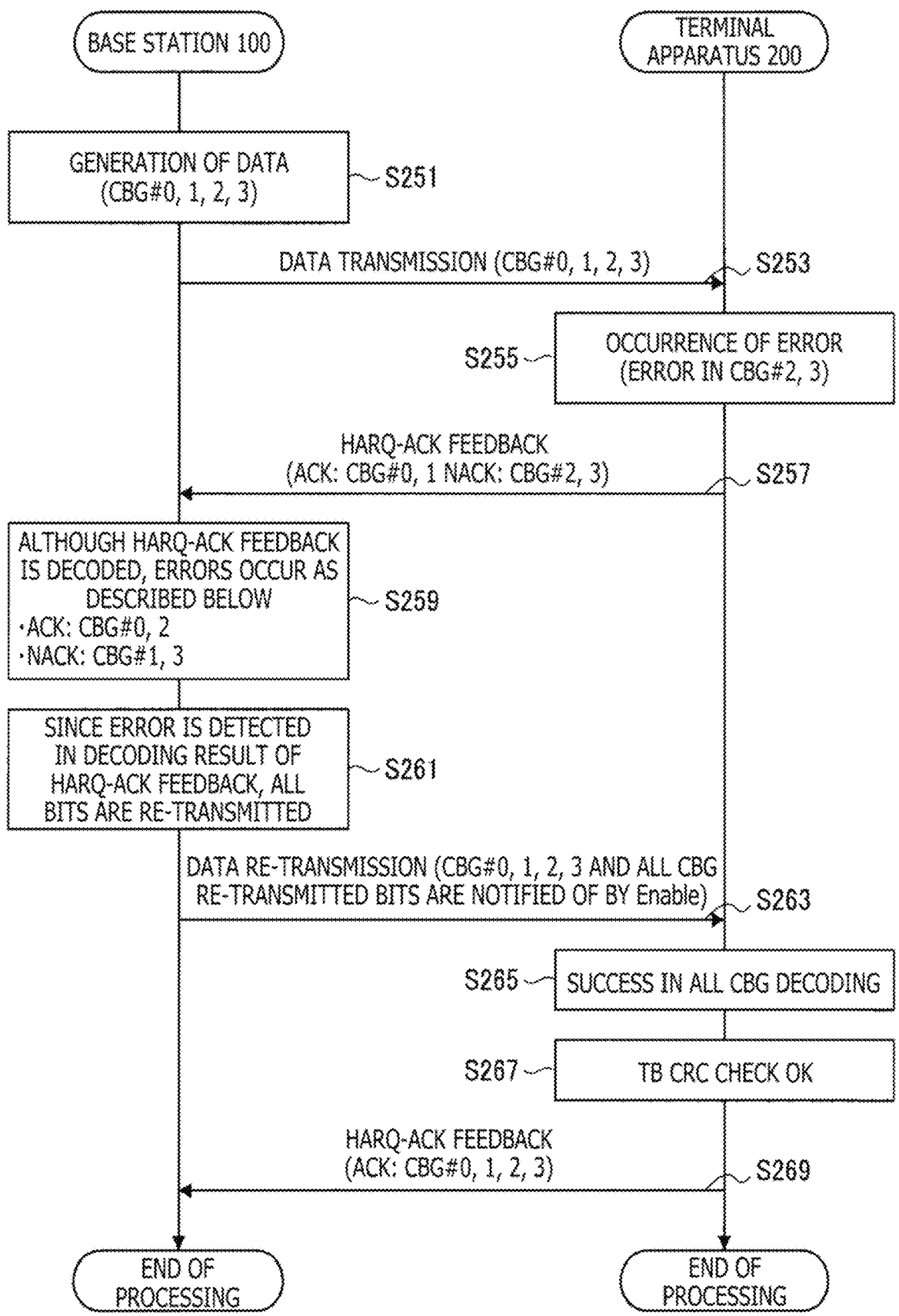
FIG. 12 is a schematic sequence diagram depicting an example of a flow of a series of processes of a system according to a working example 1-3.

For example, FIG. 12 is a schematic sequence diagram depicting an example of a flow of a series of processes of a system according to the working example 1-3. It is to be noted that, in the present description, it is assumed that one TB includes CBG #0 to CBG #3. Further, processes denoted by reference signs S251 to S259 in FIG. 12 are similar to the processes denoted by the reference signs S201 to S209 in the example depicted in FIG. 11, and therefore, detailed description of them is omitted.

In the present working example, the base station 100 (decision section 155) decides, on the basis of an error detection code such as a CRC, whether or not an HARQ-ACK feedback from the terminal apparatus 200 is successfully decoded correctly. Here, since an error occurs in decoding of the HARQ-ACK feedback, the base station 100 decides that the HARQ-ACK feedback is not decoded correctly. In particular, since the base station 100 detects an error in a decoding result of the HARQ-ACK feedback, it re-transmits all CBGs (namely, CBG #0 to CBG #3) included in the TB to the terminal apparatus 200. Further, at this time, the base station 100 sets all CBG re-transmission bits in control information such as DCI to Enable to notify the terminal apparatus 200 that all CBGs are re-transmitted (S261 and S263).

Further, the terminal apparatus 200 recognizes, on the basis of the control information notified from the base station, which one of re-transmission of all CBGs and re-transmission of a CBG or CBGs same as those upon preceding time transmission is performed and attempts decoding of a corresponding CBG or CBGs in response to a result of the recognition. For example, in the case of an example depicted in FIG. 12, since all CBGs are re-transmitted by the base station 100, the terminal apparatus 200 decodes all re-transmitted CBGs again. Then, in the case where the terminal apparatus 200 succeeds in decoding of all CBGs (S265) and besides recognizes, on the basis of an error detection code such as a CRC, that the TB is decoded correctly (S267), the terminal apparatus 200 feeds back ACK in regard to CBG #0, CBG #1, CBG #2 and CBG #3 to the base station 100 (S269). By the above, a discrepancy in recognition relating to CBGs between the base station 100 and the terminal apparatus 200 can be eliminated.

It is to be noted that, as described hereinabove, the present working example presupposes that it includes a contrivance capable of detecting, in the case where the base station 100 fails to decode an HARQ-ACK feedback, the failure. As a particular example, it is conceivable to make it possible for the base station 100 to detect a decoding error of the HARQ-ACK feedback by adding an error detection code such as a CRC to the HARQ-ACK feedback.

Working Example 1-4: Determination Based on CBG Index Recognition Means

Subsequently, another example of the technology for improving the system according to the working example 1-2 described above is described as the working example 1-4. In the present working example, an example of a contrivance that makes it possible for the terminal apparatus 200 side to recognize which CBG is transmitted without performing such notification from the base station 100 to the terminal apparatus 200 as in the case of 1-3 described above is described.

In particular, in the present working example, the base station 100 applies scramble based on an index associated with a corresponding CBG to information or data to be transmitted to the terminal apparatus 200 such that the terminal apparatus 200 recognizes which CBG is transmitted.

As a more particular example, a case in which a CRC is added to each CB is conceivable. On the basis of such a presupposition as just described, the base station 100 scrambles the CRC of the CB, for example, on the basis of an ID corresponding to an index of the CBG to which the CB belongs. Consequently, the CRC of each CB included in the TB is scrambled on the basis of the ID corresponding to the index of the CBG to which the CB belongs. Further, the base station 100 transmits data obtained by scrambling the CRC of the CB with the ID corresponding to the index of the CBG to the terminal apparatus 200. Although the terminal apparatus 200 performs check of the CRC after decoding of each CB, at this time, the terminal apparatus 200 performs descramble with the ID corresponding to the CBG to search for an ID corresponding to a CBG with regard to which the CRC check result is OK. For example, in the case where the terminal apparatus 200 descrambles, after decoding of CB #2, the CRC of CB #2 on the basis of the ID corresponding to CBG #1 and the CRC check result indicates OK, the terminal apparatus 200 can recognize that CB #2 belongs to CBG #1. It is to be noted that, in the following description, means for recognizing a CBG that becomes a target of transmission on the basis of the contrivance described above is referred to also as "CBG index recognition means."

Figure 13:
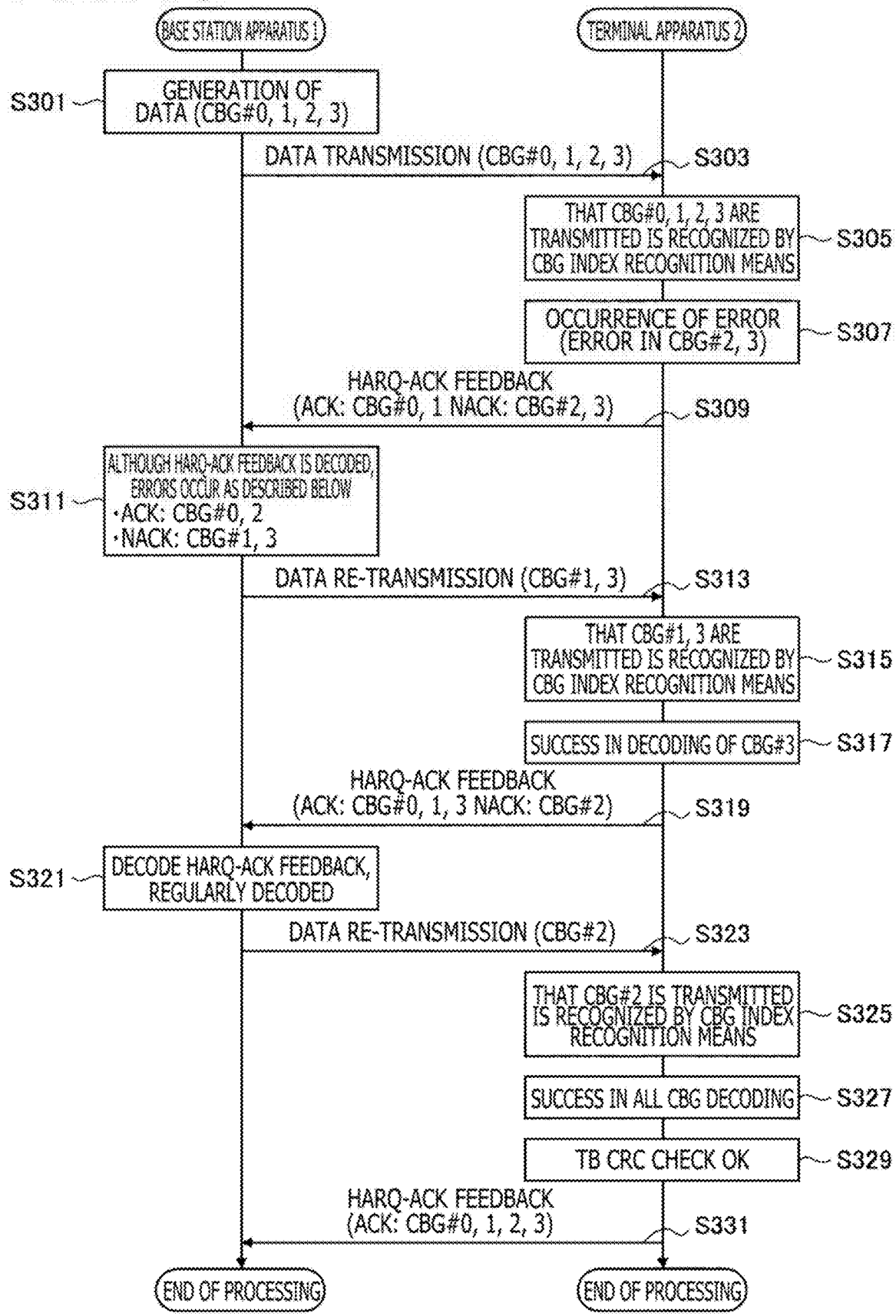
FIG. 13 is a schematic sequence diagram depicting an example of a flow of a series of processes of a system according to a working example 1-4.

For example, FIG. 13 is a schematic sequence diagram depicting an example of a flow of a series of processes of a system according to the working example 1-4. It is to be noted that, in the present description, it is assumed that one TB includes CBG #0 to CBG #3.

As described in FIG. 13, if data to be made a transmission target is generated, then the base station 100 carries out predetermined processes such as encoding for the data for each CB and groups the CBs into CBG #0 to CBG #3 according to communication settings (S131). Further, the base station 100 scrambles the CRC of each CB on the basis of the ID corresponding to the index of the CBG to which the CB belongs (S301). Then, the base station 100 transmits the target data (CBG #0 to CBG #3) to the terminal apparatus 200 of the transmission destination (S303).

The terminal apparatus 200 searches for an ID corresponding to a CBG with regard to which the CRC check result is OK by performing, after decoding of each CB, descrambling of the CRC of the CB on the basis of the IDs corresponding to the CBGs as described hereinabove. By this, the terminal apparatus 200 recognizes that CBG #0 to CBG #3 are transmitted (S305). Here, it is assumed that an error occurs upon decoding of the data and the terminal apparatus 200 fails to correctly decode CBG #2 and CBG #3 (S307). The terminal apparatus 200 performs HARQ-ACK feedback to the base station 100 in response to a result of the decision (S309). In this case, the terminal apparatus 200 feeds back ACK in regard to CBG #0 and CBG #1 and feeds back NACK in regard to CBG #2 and CBG #3 to the base station 100.

In contrast, it is assumed that, although the base station 100 succeeds in decoding itself of the HARQ-ACK feedback, an error occurs with a result of the decoding, and it is recognized that CBG #0 and CBG #2 correspond to ACK and CBG #1 and CBG #3 correspond to NACK (S311). In this case, the base station 100 determines CBG #1 and CBG #3 as a target of re-transmission. In particular, the base station 100 scrambles the CRCs of the CBs included in CBG #1 and CBG #3 on the basis of the IDs corresponding to the indices of the CBGs to which the CBs belong. Then, the base station 100 re-transmits CBG #1 and CBG #3 to the terminal apparatus 200 (S313).

The terminal apparatus 200 performs, after decoding of each of the re-transmitted CBs, descramble of the CRC of the CB on the basis of the ID corresponding to each CBG to search for an ID corresponding to a CBG whose CRC check result is OK, similarly to the process denoted by the reference sign S305. Consequently, the terminal apparatus 200 recognizes that CBG #1 and CBG #3 are transmitted (S315). In particular, the terminal apparatus 200 recognizes that, although it succeeds in decoding of CBG #3 (S317), it results in failure in decoding of CBG #2. In particular, in this case, the terminal apparatus 200 feeds back ACK in regard to CBG #0, CBG #1 and CBG #3 but feeds back NACK in regard to CBG #2 to the base station 100 (S319).

Then, it is assumed that the base station 100 succeeds in decoding of the HARQ-ACK feedback (S319) from the terminal apparatus 200 (S321). In this case, the base station 100 determines CBG #2 as a target of re-transmission. In particular, the base station 100 scrambles the CRC of each CB included in CBG #2 on the basis of the ID corresponding to the index of the CBG to which the CB belongs. Then, the base station 100 re-transmits CBG #2 to the terminal apparatus 200 (S323). The terminal apparatus 200 recognizes, on the basis of a method similar to that of the process denoted by the reference sign S305, that CBG #2 is transmitted (S325). Then, in the case where the terminal apparatus 200 succeeds in decoding of all CBGs (S327) and besides recognizes, on the basis of an error detection code such as a CRC, that the TB is decoded correctly (S329), it feeds back ACK in regard to CBG #0, CBG #1, CBG #2 and CBG #3 to the base station 100 (S331).

As described above, in the present working example, while the base station 100 does not notify the terminal apparatus 200 of control information relating to CBGs, the terminal apparatus 200 can recognize which CBG is transmitted.

It is to be noted that, although the foregoing description is directed to an example in which a CRC of a CB is scrambled, if the terminal apparatus 200 can recognize which CBG is transmitted, only the example described above is not necessarily restrictive. As a particular example, in the case where a CRC is applied to each CBG, the CRC of the CBG may be scrambled with an ID corresponding to the CBG. Further, as another example, not only a CRC, but an entire CB or CBG may be scrambled with an ID corresponding to the CBG.

Further, although the foregoing description is directed to an example of scramble, interleave may be applied in place of scramble.

As described above, according to the present working example, the base station 100 can notify the terminal apparatus 200 of which CBG is transmitted without newly adding control information. Further, also in the case where the base station 100 cannot detect an error in HARQ-ACK feedback or fails to detect an error, the terminal apparatus 200 can recognize which CBG is transmitted by the CBG index recognition means described above. Therefore, with the system according to the present working example, a discrepancy relating to a CBG between the base station 100 and the terminal apparatus 200 can be eliminated.

Working Example 1-5: Improvement Plan of Working Example 1-1

Subsequently, an example of a technology that improves the system according to the working example 1-1 described above is described as the working example 1-5.

As indicated in the working example 1-1, in the case where a CBG transmitted is dynamically notified by control information such as DCI, there is a problem that, if the CBG number to be transmitted changes, then also the Payload size of DCI changes and the blind decoding number increases. In contrast, for example, in order to make the blind decoding number unchangeable, also it is conceivable to perform padding of part of information of a CBG to be notified by DCI or the like. However, in this case, wasteful information corresponding to the padding bits sometimes appears. In order to solve the foregoing, the present working example proposes an example of a contrivance for adaptively changing, for example, a content of dynamic notification like DCI upon re-transmission between that in first time transmission (hereinafter referred to also as "first transmission") and that upon re-transmission.

For example, in DCI upon first transmission, Modulation and Coding rate are transmits by Modulation and coding scheme (MCS). On the other hand, if it is assumed that Coding rate upon re-transmission is the same as that upon first transmission, then there is no necessity of notification of Coding rate by DCI upon re-transmission. For example, it is assumed that, as a region for notification of MCS, 6 bits are prepared as given below.

($b_0$, $b_1$, $b_2$, $b_3$, $b_4$, $b_5$)

Here, it is assumed that $b_0$ and $b_1$ represent Modulation and $b_2$ to $b_5$ represent coding rate. At this time, by assuming that coding rate upon re-transmission is the same as coding rate upon first transmission, upon re-transmission, it is possible to use $b_2$ to $b_5$ as bits for different information. For example, if the bits are used as index information of a CBG being transmitted, it is possible to notify a terminal apparatus of information of the CBG transmitted upon re-transmission without changing the DCI bit number between those upon first transmission and upon re-transmission. It is to be noted that, since it is considered that all CBGs are transmitted upon first transmission, there is no necessity to notify the terminal apparatus of information of the CBGs.

Further, since it is considered that the decision between first transmission and re-transmission is notified by New Data Indicator (NDI) information, they can be summarized like Table 1 given below.

TABLE 1

Working example 1-5 (method that utilizes notification region of MCS)

| NDI | MCS notification region Value ($b_0$, $b_1$, $b_2$, $b_3$, $b_4$, $b_5$) | Modulation | Coding rate | CBG |
|---|---|---|---|---|
| First transmission | 000001 | QPSK | $C_{rate0}$ | All CBGs |
| First transmission | 000010 | QPSK | $C_{rate1}$ | All CBGs |
| First transmission | 000011 | QPSK | $C_{rate2}$ | All CBGs |
| First transmission | 000100 | QPSK | $C_{rate3}$ | All CBGs |
| ... | ... | ... | ... | ... |
| Re-transmission | 000001 | QPSK | Same Coding rate as upon first transmission | CBG#0 |
| Re-transmission | 000010 | QPSK | Same Coding rate as upon first transmission | CBG#1 |
| Re-transmission | 000011 | QPSK | Same Coding rate as upon first transmission | CBG#0, 1 |
| Re-transmission | 000100 | QPSK | Same Coding rate as upon first transmission | CBG#2 |
| ... | ... | ... | ... | ... |
| First transmission | 010001 | 16QAM | $C_{rate4}$ | All CBGs |
| First transmission | 010010 | 16QAM | $C_{rate5}$ | All CBGs |
| First transmission | 010011 | 16QAM | $C_{rate6}$ | All CBGs |
| First transmission | 010100 | 16QAM | $C_{rate7}$ | All CBGs |
| ... | ... | ... | ... | ... |
| Re-transmission | 010001 | 16QAM | Same Coding rate as upon first transmission | CBG#0 |
| Re-transmission | 010010 | 16QAM | Same Coding rate as upon first transmission | CBG#1 |
| Re-transmission | 010011 | 16QAM | Same Coding rate as upon first transmission | CBG#0, 1 |
| Re-transmission | 010100 | 16QAM | Same Coding rate as upon first transmission | CBG#2 |
| ... | ... | ... | ... | ... |

It is to be noted that, in the case where NDI indicates first transmission, $b_2$ to $b_5$ represent Coding rate and it is assumed that all CBGs are transmitted. On the other hand, in the case where NDI indicates re-transmission, it is assumed that Coding rate represents Coding rate same as that upon first transmission and, as CBGs, CBGs corresponding to $b_2$ to $b_5$ are transmitted.

By applying such a contrivance as described above, notification of a CBG transmitted upon re-transmission is possible without changing the DCI bit number between first transmission and re-transmission. Further, although, in the example described above, the region for Modulation perform notification of Modulation also upon re-transmission, in some cases, the region for Modulation may be utilized as a notification region of an index of a CBG upon re-transmission. For example, by assuming that Modulation upon re-transmission is the same as Modulation upon first transmission, it is possible to use, upon re-transmission, the entire notification region of MCS as a notification region for CBG indices. Further, as another example, Modulation upon re-transmission may be configured from only one bit representing whether Modulation upon re-transmission is to be decreased by one level from Modulation upon preceding time transmission (for example, from 64QAM to 16QAM, from 16QAM to QPSK or the like) or is to be maintained (for example, if Modulation upon preceding time transmission is 64QAM, 64QAM is maintained as it is or the like). This makes it possible to save, where 2 bits are conventionally used for notification of QPSK, 16QAM, 64QAM and 256QAM, one bit. It is to be noted that, in the case where a modulation method of 1024QAM, for example, which is higher than 256QAM, is to be supported, 2 bits or more can be saved.

Further, while the example described above is directed to a method that utilizes the MCS notification region, the method described above is not restrictive. As a particular example, by restricting Resource Allocation upon re-transmission, part of the Resource Allocation notification region may be utilized as a notification region for a CBG index. Further, as another example, by assuming that the Layer number upon re-transmission is equal to the Layer number upon first transmission, the Layer number notification region may be utilized as the CBG index notification region upon re-transmission. Further, not only to those examples, also to a different notification region notified by DCI or the like upon first transmission, the present method is applicable.

At this time, as one example, in the case where the notification region for a Layer number is used as the CBG index notification region upon re-transmission, although there is no problem in the case where the Transform block number is one, in the case where the Transform block number is two or more, an examination described below is required. In particular, since the region for performing notification of Layer is a common region to individual Transport Blocks, there is the possibility that a problem may occur in the case where the a CBG index to be re-transmitted differs among the individual Transport Blocks. Here, it is assumed that the region for performing notification of Layer is (L0). Further, it is assumed that a notification region ($b_0$, $b_1$, $b_2$) of MCS to be used as the CBG index notification region upon re-transmission is prepared for each Transport Block. For example, it is assumed that, as a region for performing notification of a CBG index, ($b_0$, $b_1$, $b_2$, L0) can be used upon re-transmission. Here, although Transport Block #0 tries to transmit (1, 1, 0, 1) and Transport Block #2 tries to transmit (1, 0, 1, 0) upon re-transmission, since L0 is a region that is used commonly by all Transport Blocks, there is the possibility that a problem may occur in the case where the value differs among the Transport Blocks. Therefore, in order to utilize the region for L0, even in the case of ACK, in some cases, a CBG is re-transmitted. For example, in the example described above, such a method is conceivable that Transport Block #2 is adjusted so as to transmit a CBG corresponding to (1, 0, 1, 1). By such adjustment as described above, it becomes possible to re-utilize even a region that is utilized commonly among a plurality of Transport Blocks such as a region for the Layer number as the CBG index notification region upon re-transmission. Further, also a case in which Coding rate is notified as an index $I_{TBS}$ of Transport Block Size (TBS) is conceivable. In this case, Table 1 described above can be rewritten like Table 2 indicated below.

TABLE 2

Working example 1-5 (where notified as index $I_{TBS}$ of TBS)

| NDI | MCS notification region Value ($b_0$, $b_1$, $b_2$, $b_3$, $b_4$, $b_5$) | Modulation | $I_{TBS}$ | CBG |
|---|---|---|---|---|
| First transmission | 000001 | QPSK | 1 | All CBGs |
| First transmission | 000010 | QPSK | 2 | All CBGs |
| First transmission | 000011 | QPSK | 3 | All CBGs |
| First transmission | 000100 | QPSK | 4 | All CBGs |
| ... | ... | ... | ... | ... |
| Re-transmission | 000001 | QPSK | Same $I_{TBS}$ as upon first transmission | CBG#0 |
| Re-transmission | 000010 | QPSK | Same $I_{TBS}$ as upon first transmission | CBG#1 |
| Re-transmission | 000011 | QPSK | Same $I_{TBS}$ as upon first transmission | CBG#0, 1 |
| Re-transmission | 000100 | QPSK | Same $I_{TBS}$ as upon first transmission | CBG#2 |
| ... | ... | ... | ... | ... |
| First transmission | 010001 | 16QAM | 1 | All CBGs |
| First transmission | 010010 | 16QAM | 2 | All CBGs |
| First transmission | 010011 | 16QAM | 3 | All CBGs |
| First transmission | 010100 | 16QAM | 4 | All CBGs |
| ... | ... | ... | ... | ... |
| Re-transmission | 010001 | 16QAM | Same $I_{TBS}$ as upon first transmission | CBG#0 |
| Re-transmission | 010010 | 16QAM | Same $I_{TBS}$ as upon first transmission | CBG#1 |
| Re-transmission | 010011 | 16QAM | Same $I_{TBS}$ as upon first transmission | CBG#0, 1 |
| Re-transmission | 010100 | 16QAM | Same $I_{TBS}$ as upon first transmission | CBG#2 |
| ... | ... | ... | ... | ... |

Also in the case where a CBG index notification region is to be prepared newly, the present method can be applied. For example, although, upon re-transmission, the CBG index notification region is used as a region for the notification of which CBG is transmitted, since it is considered that, on the other hand, all CBGs are transmitted upon first transmission, it is possible to use the CBS index notification region as a notification region for different information. As a particular example, it is conceivable as an example to use, upon first transmission, the CBG index notification region to performing notification of a timing at which a terminal apparatus is to transmit back an HARQ-ACK feedback. Further, free from the example described above, the CBS index notification region may be utilized for some other notification use.

Working Example 1-6: Determined Associated with Reference Signal Series

Now, an example of a technology of reducing an explicit notification of CBG Index by determination associated with a Reference Signal series is described as working example 1-6.

For example, such association is possible that, in the case where the Reference Signal pattern #0 is transmitted, CBG Index #0 is transmitted; in the case where the Reference Signal pattern #1 is transmitted, CBG Index #1 is transmitted; and in the case where the Reference Signal pattern #2 is transmitted, Index #0 and Index #1 are transmitted. In this case, the terminal apparatus 200 performs blind decoding of all Reference Signal patterns to decide which Reference Signal pattern is transmitted and decides, from the Reference Signal pattern, which CBG Index is transmitted. As Reference Signal, for example, De-modulation Reference Signal (DMRS) or the like is available.

<2.4. HARQ-ACK Transmission Means for Downlink Transmitted CBG>

Subsequently, an example of transmission means for an HARQ-ACK feedback to a downlink transmitted CBG is described. For example, while the example described above indicates in what manner the base station 100 transmits a CBG in downlink transmission, also it is important in what manner the terminal apparatus 200 transmits back an HARQ-ACK feedback in response to the transmission.

Therefore, in the following, an example of means of the terminal apparatus 200 for transmitting back an HARQ-ACK feedback is described as working examples.

Working Example 2-1: HARQ-ACK of Entire CBGs Is Transmitted

First, as a working example 2-1, an example of a case is described in which the terminal apparatus 200 always transmits an HARQ-ACK feedback in regard to all CBGs included in a TB.

For example, it is assumed that a TB includes totaling four CBGs. In this case, the terminal apparatus 200 always transmits an HARQ-ACK feedback corresponding to four CBGs back to the base station 100. In particular, also in the case where the base station 100 transmits only CBG #2 and CBG #3 upon re-transmission, the terminal apparatus 200 transmits back an HARQ-ACK feedback of all of CBG #0, CBG #1, CBG #2 and CBG #3. It is to be noted that, in this case, CBG #0 and CBG #1 that are not transmitted from the base station 100 are transmitted, for example, as DTX.

In the present working example, an HARQ-ACK feedback corresponding to all CBGs included in a TB is transmitted to the base station 100. Therefore, in the present working example, even if a discrepancy of a transmitted CBG index occurs between the base station 100 and the terminal apparatus 200, it sometimes becomes possible for the base station 100 to detect the discrepancy from the HARQ-ACK feedback. However, in the present working example, since any CBG that is not transmitted from the base station 100 is transmitted as DTX, it becomes a problem that a wasteful bit appears.

Working Example 2-2: HARQ-ACK Only of Received CBG is Transmitted

Now, an example of a case in which the terminal apparatus 200 transmits an HARQ-ACK feedback only in regard to a CBG or CBGs received from the base station 100 is described as the working example 2-2.

For example, it is assumed that CBG #2 and CBG #3 correspond to NACK in first time transmission. In this case, the terminal apparatus 200 feeds back ACK in regard to CBG #0 and CBG #1 and feeds back NACK in regard to CBG #2 and CBG #3 to the base station 100. Further, the base station 100 that receives the HARQ-ACK feedback from the terminal apparatus 200 re-transmits CBG #2 and CBG #3 in regard to which NACK is fed back to the terminal apparatus 200. The terminal apparatus 200 transmits back, to the base station 100, an HARQ-ACK feedback only in regard to the re-transmitted CBG #2 and CBG #3 as an HARQ-ACK feedback in regard to the re-transmission. In particular, upon re-transmission, the bit number of the HARQ-ACK feedback decreases, and the information amount of control information can be reduced.

However, in the present working example, there is the possibility that a problem may occur in the case where a discrepancy in recognition regarding what CBG is transmitted occurs between the base station 100 and the terminal apparatus 200 as described hereinabove also in connection with the working example 1-2.

In contrast, for example, by applying the CBG index recognition means indicated as the working example 1-4, it becomes possible for the terminal apparatus 200 to recognize that, in the case where a CBG transmitted from the base station 100 is not correct, the CBG is not a correct CBG. On the other hand, the base station 100 side has no means for recognizing that an erroneous CBG is transmitted. Therefore, in addition to the technology described in connection with the present working example, a contrivance becomes required by which, for example, in the case where the terminal apparatus 200 recognizes that the CBG is not a correct CBG, notification of information according to the result of the recognition is issued to the base station 100. Therefore, in the following, examples of the contrivance for improving the present working example are described as working examples 2-3 and 2-4.

Working Example 2-3: Transmission of all CBG Re-Transmission Request

First, an example of a technology for improving the system according to the working example 2-2 described above is described as the working example 2-3. In the present working example, the terminal apparatus 200 transmits a re-transmission request for all CBGs included in a TB to the base station 100 as occasion demands.

As a particular example, it is assumed that CBG #2 and CBG #3 correspond to NACK in first time transmission. In this case, the terminal apparatus 200 feeds back ACK in regard to CBG #0 and CBG #1 and feeds back NACK in regard to CBG #2 and CBG #3 to the base station 100.

On the other hand, it is assumed that, although the base station 100 succeeds in decoding itself of an HARQ-ACK feedback, an error occurs in a decoding result and it is recognized by the base station 100 that CBG #0 and CBG #2 correspond to ACK and CBG #1 and CBG #3 correspond to NACK. In this case, the base station 100 re-transmits CBG #1 and CBG #3.

In response to this, the terminal apparatus 200 recognizes that CBGs that are not correct are transmitted, for example, using the CBG index recognition means described hereinabove in the description of the working example 1-4. Thereafter, the terminal apparatus 200 notifies the base station 100 of a re-transmission request for all CBGs. This makes it possible for the base station 100 to transmit correct CBGs.

It is to be noted that the re-transmission request for all CBGs may be transmitted in addition to the HARQ-ACK feedback or may be transmitted in place of the HARQ-ACK feedback.

Working Example 2-4: Notification of CBG Index Whose Re-Transmission is Required Now, another example of the technology for improving the system according to the working example 2-2 described above is described as the working example 2-4. In the present working example, the terminal apparatus 200 transmits the index of a CBG whose re-transmission is required to the base station 100.

As a particular example, it is assumed that CBG #2 and CBG #3 correspond to NACK in first time transmission. In this case, the terminal apparatus 200 feeds back ACK in regard to CBG #0 and CBG #1 and feeds back NACK in regard to CBG #2 and CBG #3 to the base station 100.

On the other hand, it is assumed that, although the base station 100 succeeds in decoding itself of the HARQ-ACK feedback, an error occurs in the decoding result and it is recognized by the base station 100 that CBG #0 and CBG #2 correspond to ACK and CBG #1 and CBG #3 correspond to NACK. In this case, the base station 100 re-transmits CBG #1 and CBG #3.

In response to this, the terminal apparatus 200 recognizes that CBGs that are not correct are transmitted, for example, using the CBG index recognition means described hereinabove in the description of the working example 1-4. Thereafter, the terminal apparatus 200 notifies the base station 100 of an index of the CBG whose re-transmission is required, for example, by Uplink Control Information (UCI). This makes it possible for the base station 100 to transmit a correct CBG.

It is to be noted that the notification of an index of the CBG whose re-transmission is required may be transmitted, for example, in addition to the HARQ-ACK feedback or may be transmitted in place of the HARQ-ACK feedback.

<2.5. CBG Transmission Means in Uplink Transmission>

Now, an example of a case of a technology relating to transmission of a CBG in uplink transmission is described. Although working examples of CBG transmission means in downlink transmission are described above, re-transmission by a CBG can be applied also to uplink transmission. Therefore, in the following, an example of transmission means of a CBG in uplink transmission is described as working examples. It is to be noted that, as a method of the base station 100 for performing feedback in response to uplink transmission of the terminal apparatus 200, two methods are available including a method of notifying only an ACK/NACK feedback and a method of transmitting uplink transmission Grant. Therefore, in the following, working examples in a case in which only an ACK/NACK feedback is notified and another case in which uplink transmission Grant is transmitted are described.

(a) In the Case where Only ACK/NACK Information is Notified

First, an example of a case in which only ACK/NACK information is notified is described as working examples 3-1 to 3-3. In the method described in this section, the base station 100 notifies the terminal apparatus 200 only of information of ACK/NACK as an HARQ-ACK feedback. The terminal apparatus 200 performs uplink transmission using a transmission resource determined in advance on the basis of information of the received HARQ-ACK feedback.

Working Example 3-1: Dynamic or Quasi-Static Notification or Pre-Defined Method

First, as a working example 3-1, a case in which it is explicitly notified whether the base station 100 is to explicitly notify which CBG is to be transmitted is described.

Figure 14:
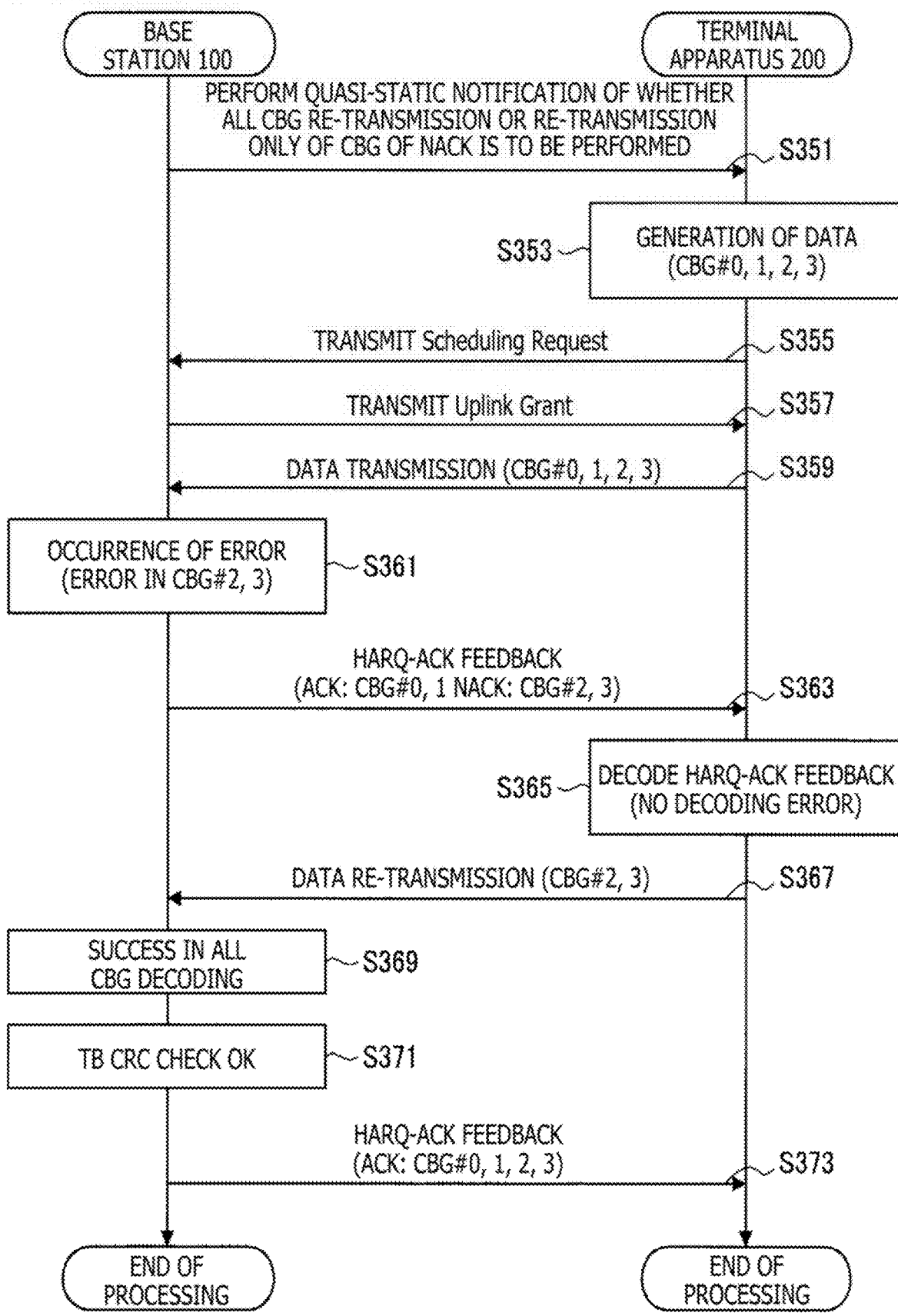
FIG. 14 is a schematic sequence diagram depicting an example of a flow of a series of processes of a system according to a working example 3-1.

For example, FIG. 14 is a schematic sequence diagram depicting an example of a flow of a series of processes of the system according to the working example 3-1 and depicts an example of a case in which the base station 100 quasi-statically notifies the terminal apparatus 200 of which CBG is to be transmitted. Note that it is assumed that, in the present description, one TB includes CBG #0 to CBG #3.

In the example depicted in FIG. 14, the base station 100 (notification section 157) performs quasi-static notification of information regarding whether all CBGs included in a TB are to be re-transmitted or only CBGs whose NACK is notified are to be re-transmitted by RRC signaling, System Information or the like (S351). When the terminal apparatus 200 re-transmits data to the base station 100, it performs the re-transmission on the basis of a method designated by the notification.

In particular, if data to be made a target of transmission is generated, then the terminal apparatus 200 (communication controlling section 241) performs predetermined processes such as encoding for the data for each CB and groups the CBs into CBG #0 to CBG #3 in accordance with settings of communication. Further, the terminal apparatus 200 (notification section 247) transmits Scheduling Request to the base station 100 (S355). Further, the base station 100 (notification section 157) transmits Uplink Grant in response to Scheduling Request from the terminal apparatus 200 (S257). This establishes communication between the terminal apparatus 200 and the base station 100. Then, the terminal apparatus 200 (communication controlling section 241) transmits data to be made a target (CBG #0 to CBG #3) to the base station 100 (S359).

The base station 100 (communication controlling section 151) receives the data (CBG #0 to CBG #3) transmitted from the terminal apparatus 200 and decodes the received data. Further, the base station (decision section 155) decides, on the basis of an error detection code such as a CRC, whether or not the received CBGs are successfully decoded correctly. Here, it is assumed that an error occurs upon decoding of the data and the base station 100 fails to correctly decode CBG #2 and CBG #3 (S361). The base station 100 (notification section 157) performs HARQ-ACK feedback to the terminal apparatus 200 in response to a result of the decision (S363). In this case, the base station 100 feeds back ACK in regard to CBG #0 and CBG #1 and feeds back NACK in regard to CBG #2 and CBG #3 to the terminal apparatus 200.

The terminal apparatus 200 (information acquisition section 243) acquires, as a reply to the data transmitted to the base station 100, the HARQ-ACK feedback from the base station 100. Further, at this time, the terminal apparatus 200 (communication controlling section 241) may decode the HARQ-ACK feedback and decide on the basis of an error detection code such as a CRC whether or not the HARQ-ACK feedback is successfully decoded correctly. Here, it is assumed that the HARQ-ACK feedback is decoded correctly (S365).

Then, the terminal apparatus 200 (communication controlling section 241) performs re-transmission of the data on the basis of the HARQ-ACK feedback from the base station 100. At this time, the terminal apparatus 200 selectively changes over, on the basis of the information quasi-statically from the base station 100 (S351), whether all CBGs included in the TB are to be re-transmitted or only CBGs whose NACK is notified are to be re-transmitted. For example, the example depicted in FIG. 14 indicates a case in which re-transmission only of CBGs whose NACK is notified is notified from the base station 100, and the terminal apparatus 200 re-transmits only CBG #2 and CBG #3 whose NACK is notified to the base station 100 (S367).

The base station 100 (communication controlling section 151) receives the data (CBG #2, CBG #3) re-transmitted from the terminal apparatus 200 and decodes the received data. At this time, since the terminal apparatus 200 preforms re-transmission on the basis of the quasi-static notification to the terminal apparatus 200, the base station 100 can recognize whether all CBGs included in the TB or only CBGs whose NACK is notified are to be re-transmitted from the terminal apparatus 200.

Then, in the case where the base station 100 succeeds in decoding of all CBGs (S369) and besides recognizes, on the basis of an error detection code such as a CRC, that the TB is decoded correctly (S371), the base station 100 feeds back ACK in regard to the CBG #0, CBG #1, CBG #2 and CBG #3 to the terminal apparatus 200 (S373).

In the foregoing, as an example of a flow of a series of processes of the system according to the working example 3-1, an example of a case in which the base station 100 quasi-statically notifies the terminal apparatus 200 of which CBG is to be transmitted has been described with reference to FIG. 14.

Further, the base station 100 may dynamically notify the terminal apparatus 200 of which CBG is to be transmitted. For example, FIG. 15 is a schematic sequence diagram depicting another example of a flow of a series of processes of the system according to the working example 3-1 and indicates an example of a case in which the base station 100 dynamically notifies the terminal apparatus 200 of which CBG is to be transmitted.

Figure 15:
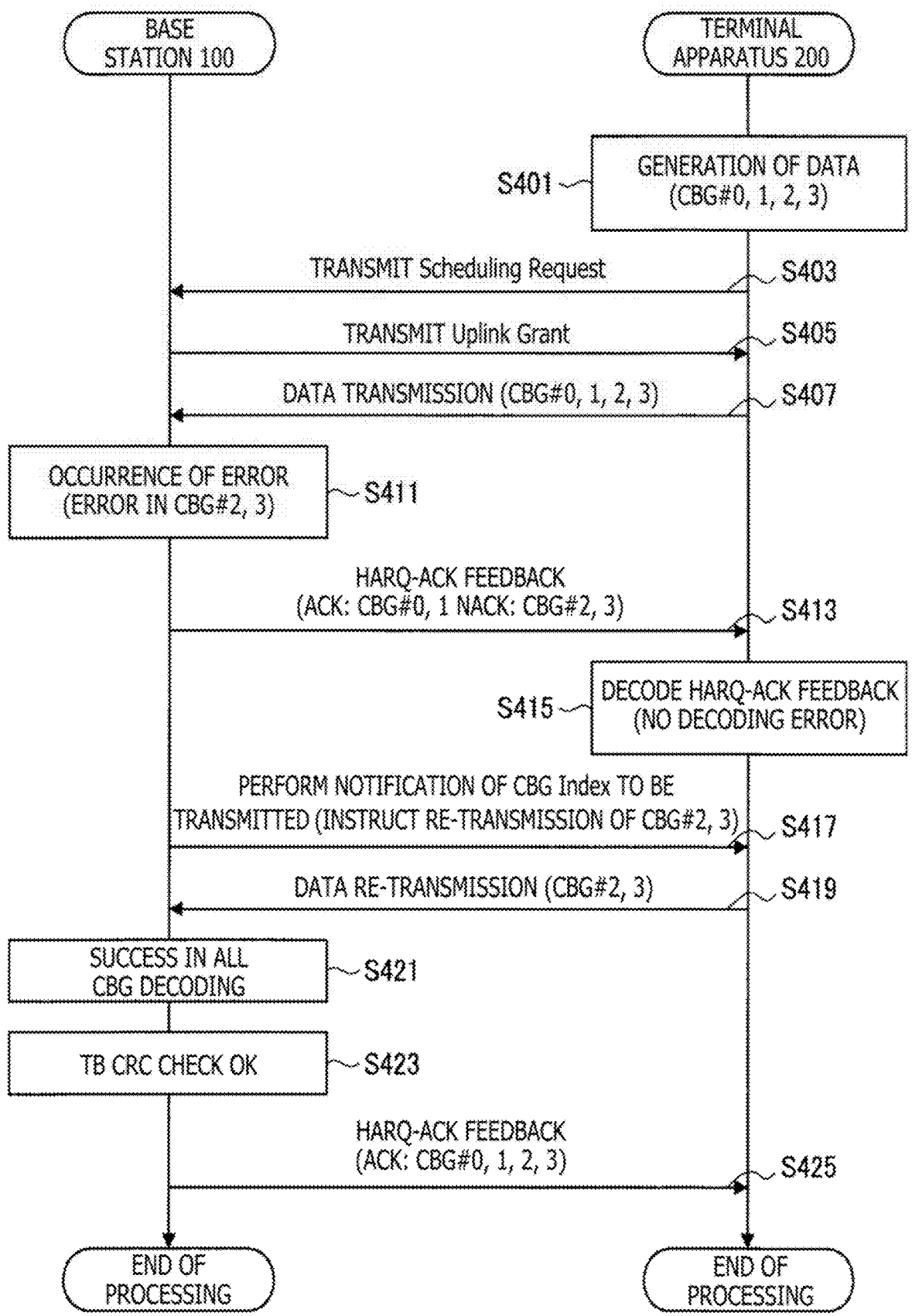
FIG. 15 is a schematic sequence diagram depicting another example of a flow of a series of processes of the system according to the working example 3-1.

In particular, in the example depicted in FIG. 15, in place of the notification indicated by reference sign S351 in FIG. 14, notification indicated by a reference sign S417 is used to indicate a CBG to be made a target of re-transmission from the base station 100 to the terminal apparatus 200. It is to be noted that, in the example depicted in FIG. 15, processes indicated by reference signs S401 to S415 and S419 to S423 are similar to the processes indicated by reference signs S353 to S356 and S367 to S371 in FIG. 14. In particular, the terminal apparatus 200 selectively changes over, for example, on the basis of the information notified dynamically from the base station 100 by control information such as DCI (S417), whether all CBGs included in the TB are to be re-transmitted or only the CBGs whose NACK is notified are to be re-transmitted. As a particular example, the example depicted in FIG. 15 indicates a case in which re-transmission only of CBGs whose NACK is notified is notified from the base station 100, and the terminal apparatus 200 re-transmits only CBG #2 and CBG #3 whose NACK is notified to the base station 100 (S419).

Further, as another example, whether all CBGs included in a TB are to be re-transmitted or only CBGs whose NACK is notified are to be re-transmitted may be Pre-defined as a specification. In this case, such explicit notification from the base station 100 to the terminal apparatus 200 as in the examples depicted in FIGS. 14 and 15 many not be performed.

Working Example 3-2: Method Determined by Terminal Apparatus

First, an example of a case in which the terminal apparatus 200 determines which CBG is to be transmitted is described as the working example 3-2.

In the present working example, the terminal apparatus 200 explicitly notifies the base station 100 of which CBG is transmitted by a predetermined notification method or indirectly notifies the base station 100 by applying the CBG index recognition means described hereinabove.

Figure 16:
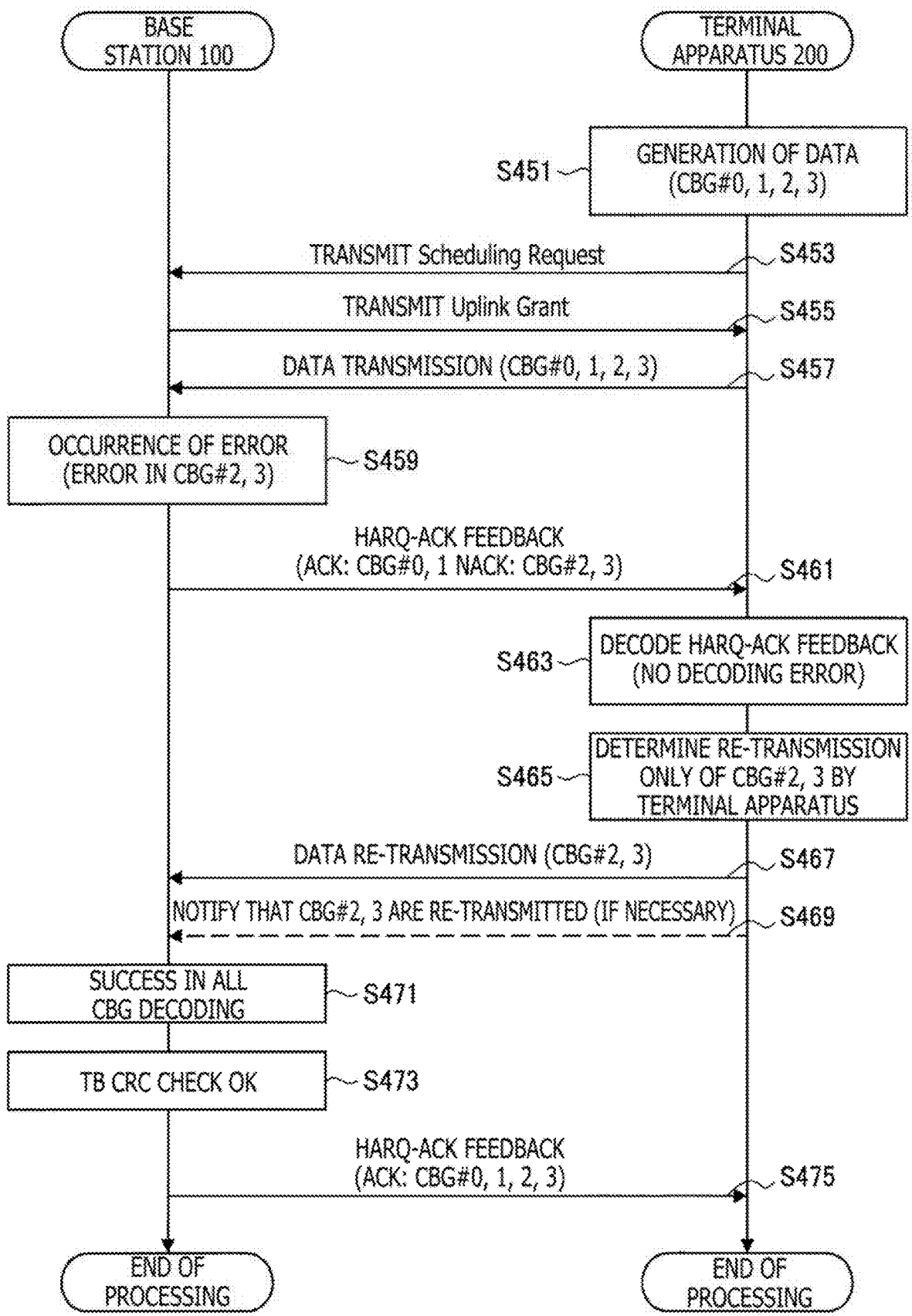
FIG. 16 is a schematic sequence diagram depicting an example of a flow of a series of processes of a system according to a working example 3-2.

For example, FIG. 16 is a schematic sequence diagram depicting an example of a flow of a series of processes of a system according to the working example 3-2 and depicts an example of a case in which the terminal apparatus 200 determines which CBG is to be transmitted. It is to be noted that, in the present description, it is assumed that one TB includes CBG #0 to CBG #3. Further, processes denoted by reference signs S451 to S463 are similar to the processes denoted by the reference signs S401 to S415 in FIG. 15, and therefore, detailed description of them is omitted.

The terminal apparatus 200 acquires an HARQ-ACK feedback from the base station 100 as a reply to data transmitted to the base station 100 and determines which CBG is to be re-transmitted in response to the HARQ-ACK feedback. For example, in the example depicted in FIG. 16, the base station 100 feeds back ACK in regard to CBG #0 and CBG #1 and feeds back NACK in regard to CBG #2 and CBG #3 to the terminal apparatus 200 (S461).

On the other hand, the terminal apparatus 200 determines that re-transmission is to be performed only in regard to CBG #2 and CBG #3 whose NACK is notified (S465) and re-transmits CBG #2 and CBG #3 to the base station 100 (S467). Further, at this time, the terminal apparatus 200 may notify the base station 100 that CBG #2 and CBG #3 are re-transmitted on the basis of a predetermined notification method (S469). It is to be noted that, for the notification, for example, UCI, PUSCH or the like can be utilized. This makes it possible for the base station 100 to recognize, on the basis of the notification from the terminal apparatus 200, that the terminal apparatus 200 re-transmits CBG #2 and CBG #3.

As another example, the terminal apparatus 200 may apply the CBG index recognition means described above when data is to be transmitted or re-transmitted to the base station 100. Since this makes it possible for the base station 100 to recognize a CBG transmitted or re-transmitted by the terminal apparatus 200 even if explicit notification is not performed from the terminal apparatus 200 to the base station 100, an overhead by the notification can be suppressed.

Then, if the base station 100 succeeds in decoding of all CBGs (S471) and besides recognizes, on the basis of an error detection code such as a CRC, that the TB is decoded correctly (S473), the base station 100 feeds back ACK in regard to CBG #0, CBG #1, CBG #2 and CBG #3 to the terminal apparatus 200 (S475).

Working Example 3-3: Determined in Association with Reference Signal Series

Subsequently, as a working example 3-3, an example of a technology of reducing explicit notification of CBG Index by determining in association with a Reference Signal series is described.

For example, such association is possible that, in the case where the Reference Signal pattern #0 is transmitted, CBG Index #0 is transmitted; in the case where the Reference Signal pattern #1 is transmitted, CBG Index #1 is transmitted; and in the case where the Reference Signal pattern #2 is transmitted, Index #0 and index #1 are transmitted. Reference Signal may be downlink Reference Signal transmitted from the base station 100 or may be Uplink Reference Signal transmitted from the terminal apparatus 200. In this case, the base station 100 or the terminal apparatus 200 performs blind decoding of all Reference Signal patterns to decide which Reference Signal pattern is transmitted and decides from the Reference Signal pattern which CBG Index is transmitted. As Reference Signal, for example, DMRS or the like is available.

(b) Where Uplink Grant is Notified Upon Re-Transmission

Subsequently, an example of a case in which, upon re-transmission, the base station 100 notifies the terminal apparatus 200 of uplink Grant is described as working examples 4-1 to 4-3. In the method described in the present section, the base station 100 notifies the terminal apparatus 200 of uplink Grant, and the terminal apparatus 200 performs uplink transmission (for example, re-transmission of data) on the basis of information of the notified uplink Grant.

Working Example 4-1: Where ACK/NACK Information Is Included in Uplink Grant

First, an example of a case in which the base station 100 adds ACK/NACK information to uplink Grant and notifies the terminal apparatus 200 of the uplink Grant is described as the working example 4-1.

Figure 17:
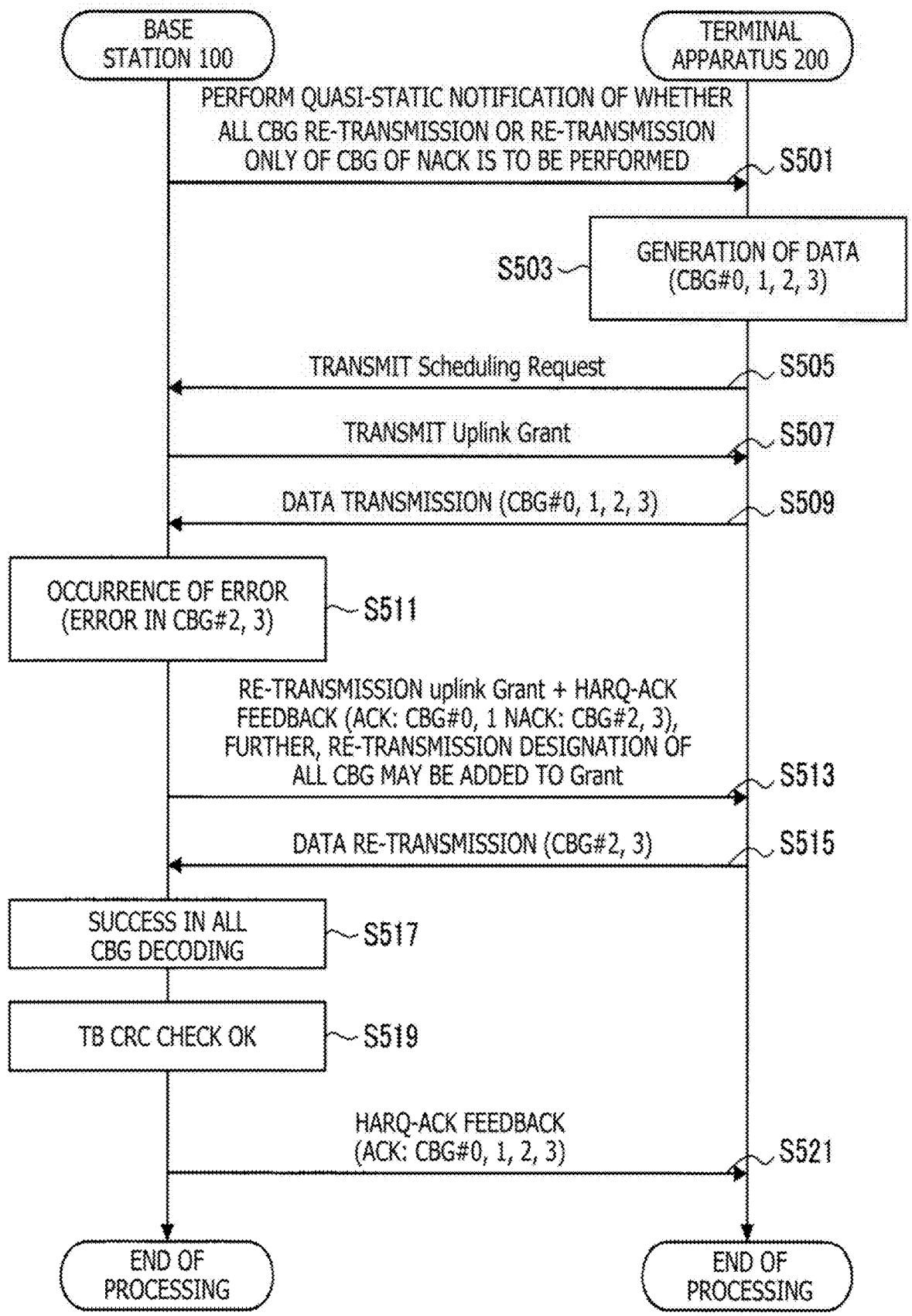
FIG. 17 is a schematic sequence diagram depicting an example of a flow of a series of processes of a system according to a working example 4-1.

For example, FIG. 17 is a schematic sequence diagram depicting an example a flow of a series of processes of the system according to the working example 4-1. Note that it is assumed that, in the present description, one TB includes CBG #0 to CBG #3. Further, processes denoted by reference signs S501 to S511 are similar to the processes denoted by the reference signs S351 to S361 in FIG. 14, and therefore, detailed description of them is omitted.

As depicted in FIG. 17, the base station 100 receives data (CBG #0 to CBG #3) transmitted from the terminal apparatus 200 and decodes the received data. Further, the base station decides, on the basis of an error detection code such as a CRC, whether or not each of the received CBGs is successfully decoded correctly. Here, it is assumed that an error occurs upon decoding of the data and the base station 100 cannot decode CBG #2 and CBG #3 correctly (S511).

In the present working example, the base station 100 allocates a resource for allowing the terminal apparatus 200 to re-transmit a CBG and notifies the terminal apparatus 200 of uplink Grant according to a result of the allocation. At this time, the base station 100 includes an HARQ-ACK feedback (namely, ACK/NACK information) according to a result of decoding of data transmitted from the terminal apparatus 200 into the uplink Grant to notify the terminal apparatus 200 of the HARQ-ACK feedback (S513). Further, the terminal apparatus 200 determines a CBG to be re-transmitted to the base station 100 in response to the HARQ-ACK feedback included in uplink Grant notified from the base station 100.

It is to be noted that, in the present working example, the method by the terminal apparatus 200 of determining whether all CBGs included in the TB are to be re-transmitted or only CBGs whose NACK is notified are to be re-transmitted is not restricted particularly. In particular, as in the example described as the working example 3-1, the terminal apparatus 200 may determine, on the basis of a quasi-static or dynamic notification from the base station 100, whether all CBGs included in the TB are to be re-transmitted or only CBGs whose NACK is notified are to be re-transmitted. Further, whether all CBGs included in a TB are to be re-transmitted or only CBGs whose NACK is notified are to be re-transmitted may be Pre-defined as a specification. It is to be noted that FIG. 17 depicts an example of a case in which the terminal apparatus 200 determines on the basis of information notified quasi-statically from the base station 100 whether all CBGs included in the TB are to be re-transmitted or only CBGs whose NACK is notified are to be re-transmitted.

Further, the terminal apparatus 200 may determine a CBG to be re-transmitted to the base station 100 Implicit. For example, the terminal apparatus 200 may determine a CBG to be re-transmitted on the basis of an uplink transmission resource size notified by Grant. In particular, in the case where the uplink transmission resource size is the same as that upon preceding time transmission, a CBG similar to that in the preceding time may be re-transmitted. On the other hand, in the case where the uplink transmission resource size is smaller than that upon preceding time transmission, the terminal apparatus 200 may transmit only a CBG whose NACK is notified. On the other hand, in the case where the uplink transmission resource size is greater than that upon preceding time transmission, the terminal apparatus 200 may re-transmit all CBGs included in the TB.

Further, as in the example described as the working example 3-2, the terminal apparatus 200 may determine whether all CBGs included in a TB are to be re-transmitted or only CBGs whose NACK is notified are to be re-transmitted.

It is to be noted that later processes are similar to those in the example depicted in FIG. 14. In particular, the terminal apparatus 200 re-transmits a CBG to be made a target to the base station 100 (S515). On the other hand, in the case where the base station 100 succeeds in decoding of all CBGs (S517) and besides recognizes, on the basis of an error detection code such as a CRC, that the TB is decoded correctly (S519), the base station 100 feeds back ACK in regard to CBG #0, CBG #1, CBG #2 and CBG #3 to the terminal apparatus 200 (S521).

Also it is possible to apply the method of changing over the substance of the dynamic notification region between first transmission and re-transmission as described hereinabove with reference to the working example 1-5 to the present working example. As a particular example, such control is possible that the region for the notification of MCS is utilized for notification of Modulation and Coding rate upon first transmission but is utilized for the notification of Modulation and ACK/NACK upon re-transmission. Naturally, the region used for the notification or the information to be notified is not limited to that of the example described above as described hereinabove as the working example 1-5.

Working Example 4-2: Where NDI Information is Included in Uplink

Subsequently, an example of a case in which the base station 100 adds New Data Indicator (NDI) to uplink Grant and notifies the terminal apparatus 200 of the uplink Grant is described as the working example 4-2.

The NDI information is information for the notification of whether uplink Grant is Grant for new data or Grant for re-transmission. In the present working example, the terminal apparatus 200 determines a CBG to be re-transmitted on the basis of the notified NDI information. For example, it is assumed that NDI corresponding to each CBG is notified. It is to be noted that, in the present description, NDIs corresponding to CBG #0, CBG #1, CBG #2 and CBG #3 are sometimes referred to as NDI #0, NDI #1, NDKI #2 and NDI #3, respectively. For example, if NDI #0 indicates re-transmission, then the terminal apparatus 200 re-transmits CBG #0. On the other hand, if NDI #1 indicates transmission of new data, then the terminal apparatus 200 may perform transmission of new data in CBG #1 or may not transmit data in CBG #1.

Figure 18:
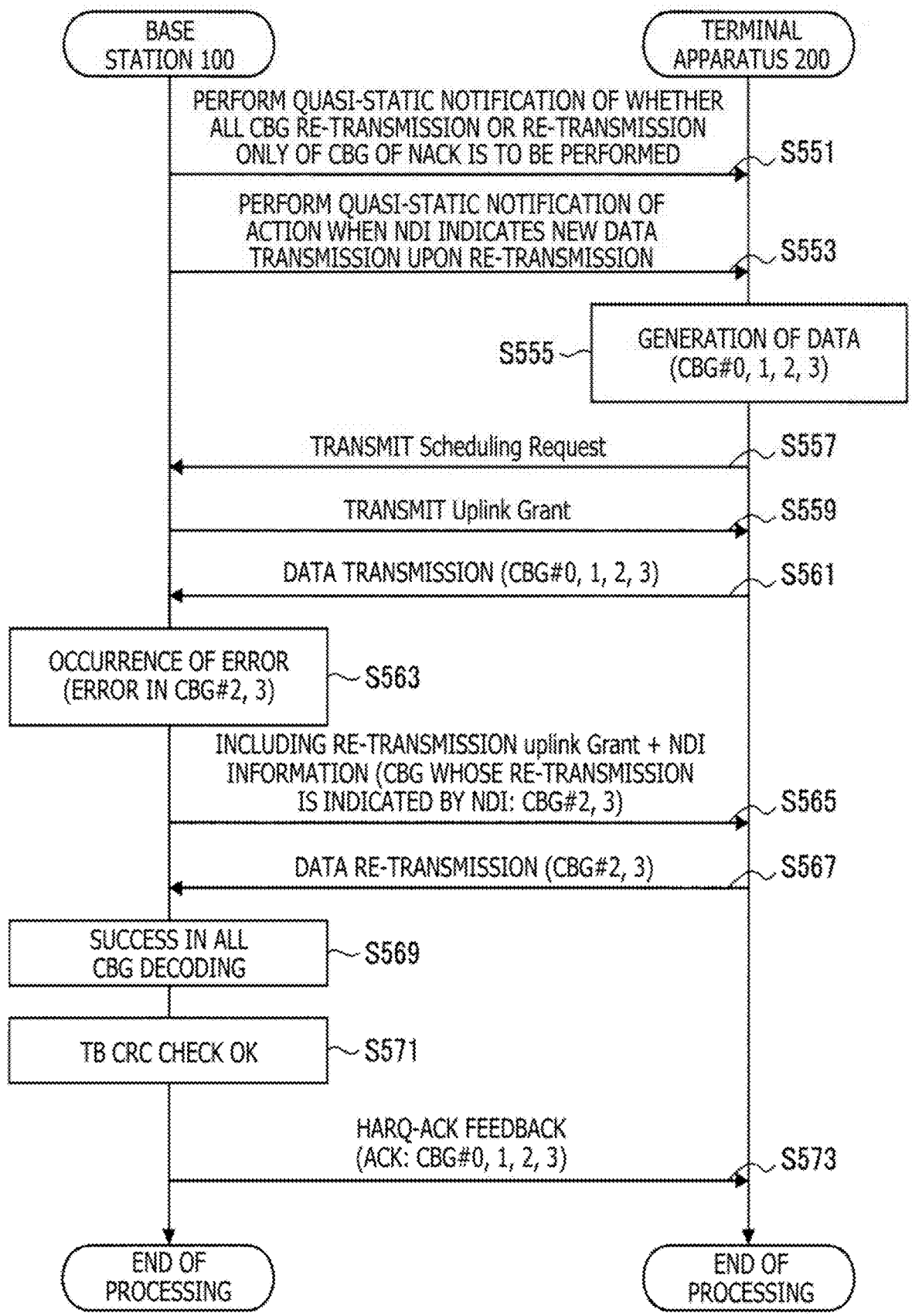
FIG. 18 is a schematic sequence diagram depicting an example of a flow of a series of processes of a system according to a working example 4-2.

Here, with reference to FIG. 18, an example of a flow of a series of processes of the system according to the present working example is described taking a more particular example. FIG. 18 is a schematic sequence diagram depicting an example of a flow of a series of processes of the system according to the working example 4-2. Note that it is assumed, in the present description, that one TB includes CBG #0 to CBG #3.

In the example depicted in FIG. 18, the base station 100 performs quasi-static notification of information indicative of whether all CBGs included in a TB are to be re-transmitted or only CBGs whose NACK is notified are to be re-transmitted by RRC signaling, System Information or the like (S551). In particular, when the terminal apparatus 200 is to re-transmit data to the base station 100, it performs the re-transmission on the basis of a method designated by the notification.

Further, the base station 100 performs quasi-static notification of information indicative of an operation in the case where, upon re-transmission, the NDI indicates transmission of new data by RRC signaling, System information or the like (S553). In particular, in the case where the NDI indicates transmission of new data, the terminal apparatus 200 executes processing relating to the CBG corresponding to the NDI on the basis of a method designated by the notification. As a particular example, the terminal apparatus 200 may determine, on the basis of the notification, whether, in regard to the CBG the NDI corresponding to which indicates transmission of new data, new data is to be transmitted by the CBG or data is not to be transmitted by the CBG.

It is to be noted that processes denoted by reference signs S555 to S563 are substantially similar to the processes denoted by the reference signs S353 to S361 in FIG. 14, and therefore, detailed description of them is omitted.

Then, as depicted in FIG. 18, the base station 100 receives data (CBG #0 to CBG #3) transmitted from the terminal apparatus 200 and decodes the received data. Further, the base station decides, on the basis of an error detection code such as a CRC, whether or not each of the received CBGs is successfully decoded correctly. Here, it is assumed that an error occurs upon decoding of the data and the base station 100 cannot decode CBG #2 and CBG #3 correctly (S563).

In the present working example, the base station 100 allocates a resource for allowing the terminal apparatus 200 to re-transmit a CBG and notifies the terminal apparatus 200 of uplink Grant according to a result of the allocation. At this time, the base station 100 includes NDI information according a result of decoding of the data transmitted from the terminal apparatus 200 into the uplink Grant to notify the terminal apparatus 200 of which CBG among the CBGs included in the TB is for new data (in other words, which CBG is for re-transmission) (S565). In particular, the terminal apparatus 200 determines a CBG to be re-transmitted to the base station 100 in response to the NDI information included in uplink Grant notified from the base station 100.

It is to be noted that, in the example depicted in FIG. 18, the terminal apparatus 200 determines an operation in the case where the NDI indicates transmission of new data in response to the quasi-static notification from the base station 100 (S553). On the other hand, in the present working example, the method of the terminal apparatus 200 for determining an operation in the case where the NDI indicates transmission of new data is not necessarily restricted to such a method that is based on the quasi-static notification from the base station 100 as depicted in FIG. 18. As a particular example, an operation in the case where the NDI indicates transmission of new data may be Pre-defined as a specification.

As a further example, an operation in the case where the NDI indicates transmission of new data may be determined by the terminal apparatus 200. It is to be noted that, in this case, the terminal apparatus 200 may separately notify the base station 100 of whether or not new data is transmitted in regard to a CBG the NDI corresponding to which indicates transmission of new data.

As a still further example, it may be notified by a single NDI whether it indicates transmission of new data or re-transmission of data in regard to all CBGs included in the TB. In this case, for example, in the case where the NDI indicates re-transmission, all CBGs included in the TB or CBGs with regard to which NACK is notified may be re-transmitted. On the other hand, in the case where the NDI indicates transmission of new data, new data in regard to all CBGs included in the TB may be transmitted.

It is to be noted that later processes are similar to those of the example depicted in FIG. 14. In particular, the terminal apparatus 200 re-transmits a CBG to be made a target to the base station 100 (S567). Further, in the case where the base station 100 succeeds in decoding of all CBGs (S569) and besides recognizes, on the basis of an error detection code such as a CRC, that the TB is decoded correctly (S571), the base station 100 feeds back ACK in regard to CBG #0, CBG #1, CBG #2 and CBG #3 to the terminal apparatus 200 (S573).

Also it is possible to apply the method of changing over the substance of the dynamic notification region between first transmission and re-transmission as described hereinabove as the working example 1-5 to the present working example. As a particular example, such control is possible that the region for the notification of MCS is utilized for notification of Modulation and Coding rate upon first transmission but is utilized for the notification of Modulation and NDI upon re-transmission. Naturally, the region used for the notification or the information to be notified is not limited to that of the example described above as described hereinabove as the working example 1-5.

Working Example 4-3: Where CBG Index Information is Included in Uplink Grant

Subsequently, an example of a case in which the base station 100 adds CBG Index information to uplink Grant and notifies the terminal apparatus 200 of the uplink Grant is described as the working example 4-3.

The CBG Index information is information for performing notification of Index of a CBG to be transmitted by a resource notified by uplink Grant. For example, in the case where the CBG Index information is #2 and #3, CBG #2 and CBG #3 are transmitted by the Granted resource.

Figure 19:
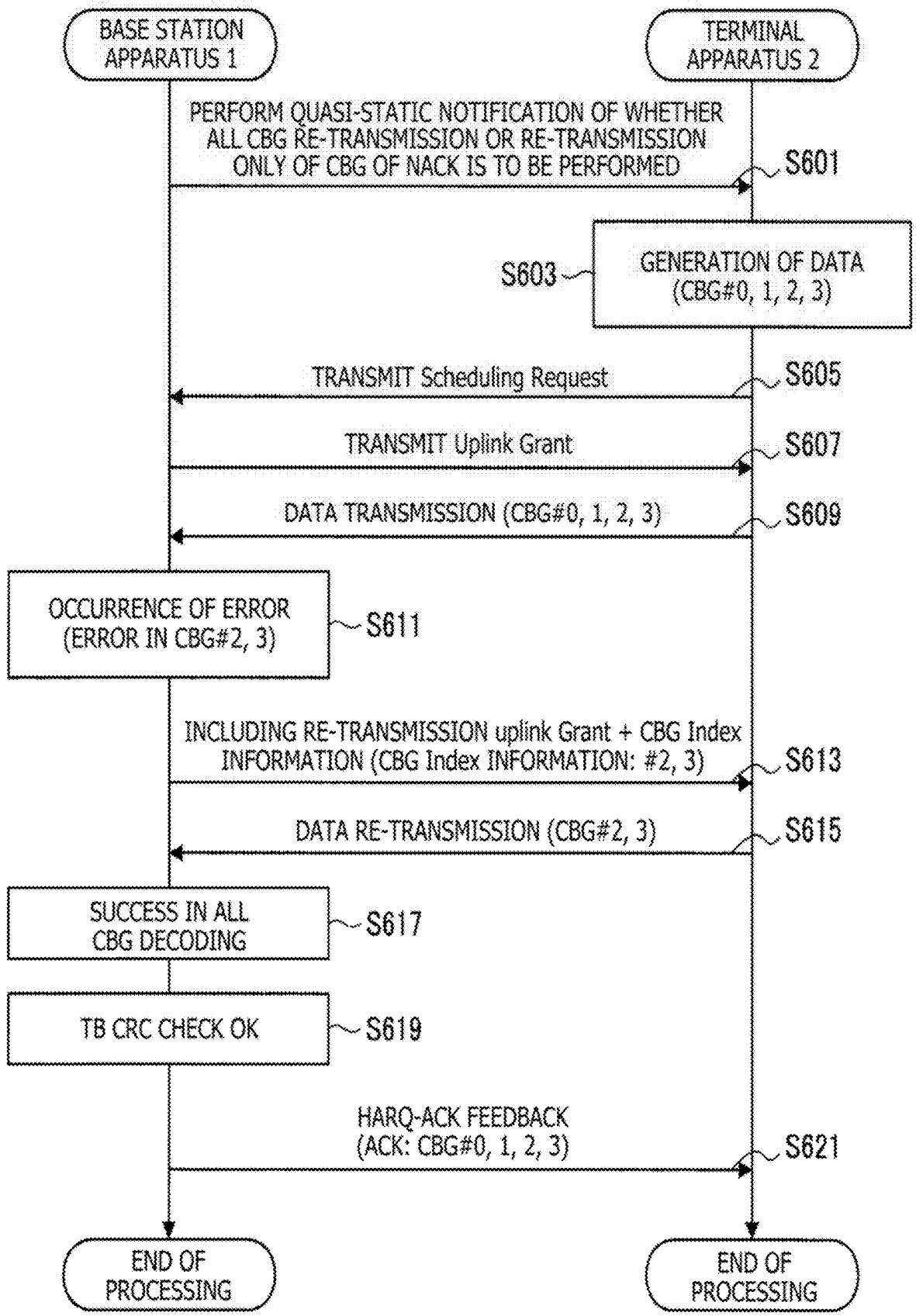
FIG. 19 is a schematic sequence diagram depicting an example of a flow of a series of processes of a system according to a working example 4-3.

For example, FIG. 19 is a schematic sequence diagram depicting an example of a flow of a series of processes of a system according to the working example 4-3. It is to be noted that, in the present description, it is assumed that one TB includes CBG #0 to CBG #3. Further, processes denoted by reference signs S601 to S611 are similar to the processes denoted by the reference signs S351 to S361 in FIG. 14, and therefore, detailed description of them is omitted.

As depicted in FIG. 19, the base station 100 receives data (CBG #0 to CBG #3) transmitted from the terminal apparatus 200 and decodes the received data. Further, the base station decides, on the basis of an error detection code such as a CRC, whether or not each of the received CBGs is successfully decoded correctly. Here, it is assumed that an error occurs upon decoding of the data and the base station 100 fails to decode CBG #2 and CBG #3 correctly (S611).

In the present working example, the base station 100 allocates a resource for allowing the terminal apparatus 200 to re-transmit a CBG and notifies the terminal apparatus 200 of uplink Grant according to a result of the allocation. At this time, the base station 100 includes CBG Index information according to a result of decoding of data transmitted from the terminal apparatus 200 into the uplink Grant to notify the terminal apparatus 200 of the CBGs to be made a target of re-transmission (S613). For example, in the case of the example depicted in FIG. 19, the CBG Index information indicates CBG #2 and CBG #3. Further, the terminal apparatus 200 determines a CBG to be re-transmitted to the base station 100 in response to the CBG Index information included in uplink Grant notified from the base station 100.

It is to be noted that the CBG Index information may be combined with the NDI information such that the NDI information designates re-transmission of the CBG designated by the CBG Index information or transmission of new data. For example, it is assumed that one TB includes CBG #0 to CBG #3 and transmission of CBG #0 to CBG #3 is notified by CBG Index information. At this time, the terminal apparatus 200 transmits all CBGs included in the TB. However, it is sometimes difficult to specify which one of re-production data and new data is a target of transmission. Therefore, the combination with the NDI information makes it possible, for example, for the terminal apparatus 200 to transmit, if the NDI indicates re-transmission, re-transmission data with all CBGs but transmit, if the NDI indicates transmission of new data, new data with all CBGs.

Further, as a different example, also it is possible to use only the CBG Index information without combining the same with the NDI information to notify whether the CBG designated by the CBG Index information is to be re-transmitted or new data is to be transmitted. For example, in the case where one TB includes CBG #0 to CBG #3, as an example of notification of CBG Index, notification using 4 bits can be listed. In this case, for example, if it is assumed that, for each bit, 1 represents re-transmission and 0 represents that no transmission is to be performed, then if all of the 4 bits indicate 1, this signifies re-transmission of all CBGs. However, if the bits corresponding to CBG #0 and CBG #1 are 1, then CBG #0 and CBG #1 are re-transmitted while CBG #2 and CBG #3 are not transmitted. Here, in the case where all bits are zero, this defines that new data is to be transmitted by all CBGs, and this eliminates the necessity for notification of NDI. It is to be noted that the meaning indicated by each bit may be opposite to those described above between 1 and 0.

It is to be noted that later processes are similar to those of the example depicted in FIG. 14. In particular, the terminal apparatus 200 re-transmits a CBG to be made a target to the base station 100 (S615). Further, in the case where the base station 100 succeeds in decoding of all CBGs (S617) and besides recognizes, on the basis of an error detection code such as a CRC, that the TB is decoded correctly (S619), the base station 100 feeds back ACK in regard to CBG #0, CBG #1, CBG #2 and CBG #3 to the terminal apparatus 200 (S621).

Further, it is possible to apply the method of changing over the substance of the dynamic notification region between first transmission and re-transmission as described hereinabove as the working example 1-5 to the present working example. As a particular example, such control is possible that the region for the notification of MCS is utilized for notification of Modulation and Coding rate upon first transmission but is utilized for the notification of Modulation and a CBG index upon re-transmission. Naturally, the region used for the notification or the information to be notified is not limited to that of the example described above as described hereinabove as the working example 1-5.

Working Example 4-4: Determined in Association with Reference Signal Series

Subsequently, an example of a technology for reducing explicit notification of CBG Index by determination in association with a Reference Signal series is described as the working example 4-4.

For example, such association is possible that, in the case where the Reference Signal pattern #0 is transmitted, CBG Index #0 is transmitted; in the case where the Reference Signal pattern #1 is transmitted, CBG Index #1 is transmitted; and in the case where the Reference Signal pattern #2 is transmitted, CBG Index #0 and CBG Index #1 are transmitted. Reference Signal may be downlink Reference Signal transmitted from the base station 100 or may be uplink Reference Signal transmitted from the terminal apparatus 200. In this case, the base station 100 or the terminal apparatus 200 performs blind decoding of all Reference Signal patterns to decide which Reference Signal pattern is transmitted and decides, from the Reference Signal pattern, which CBG Index is transmitted. As Reference Signal, for example, DMRS or the like is available.

<2.6. HARQ-ACK Transmission Means for Uplink Transmitted CBG>

Subsequently, an example of a technology relating to transmission back of an HARQ-ACK feedback for an uplink transmitted CBG. Although the foregoing indicates in what manner the terminal apparatus 200 transmits a CBG in uplink transmission, also it is important in what manner the base station 100 transmits back an HARQ-ACK feedback in response to the CBG transmission. Therefore, in the following, an example of means of the base station 100 for transmitting back an HARQ-ACK feedback to the terminal apparatus 200 is described as a working example.

Working Example 5-1: HARQ-ACK of Entire CBG is Transmitted

First, an example of a case in which the base station 100 always transmits back an HARQ-ACK feedback in regard to all CBGs included in a TB is described as a working example 5-1.

For example, it is assumed that a TB includes totaling four CBGs. In this case, the base station 100 always transmits an HARQ-ACK feedback corresponding to four CBGs back to the terminal apparatus 200. In particular, also in the case where the terminal apparatus 200 transmits only CBG #2 and CBG #3 upon re-transmission, the base station 100 transmits back an HARQ-ACK feedback of all of CBG #0, CBG #1, CBG #2 and CBG #3. It is to be noted that, in this case, CBG #0 and CBG #1 that are not transmitted from the terminal apparatus 200 are transmitted, for example, as DTX.

In the present working example, an HARQ-ACK feedback corresponding to all CBGs included in a TB is transmitted to the base station 100. Therefore, in the present working example, even if a discrepancy of a transmission CBG index occurs between the terminal apparatus 200 and the base station 100, it sometimes becomes possible for the terminal apparatus 200 to detect the discrepancy from the HARQ-ACK feedback. However, in the present working example, since any CBG that is not transmitted from the terminal apparatus 200 is transmitted as DTX, it becomes a problem that a wasteful bit appears.

Working Example 5-2: HARQ-ACK Only of Received CBG is Transmitted

Now, an example of a case in which the base station 100 transmits an HARQ-ACK feedback only in regard to a CBG or CBGs received from the terminal apparatus 200 is described as the working example 5-2.

For example, it is assumed that CBG #2 and CBG #3 correspond to NACK in first time transmission. In this case, the base station 100 feeds back ACK in regard to CBG #0 and CBG #1 and feeds back NACK in regard to CBG #2 and CBG #3 to the terminal apparatus 200. Further, the terminal apparatus 200 that receives the HARQ-ACK feedback from the base station 100 re-transmits CBG #2 and CBG #3 in regard to which NACK is fed back to the base station 100. The base station 100 transmits back, to the terminal apparatus 200, an HARQ-ACK feedback only in regard to the re-transmitted CBG #2 and CBG #3 as an HARQ-ACK feedback in regard to the re-transmission. In particular, upon re-transmission, the bit number of the HARQ-ACK feedback decreases, and the information amount of control information can be reduced.

However, in the present working example, in the case where an error occurs with information regarding which CBG is transmitted between the terminal apparatus 200 and the base station 100 (namely, in the case where a discrepancy occurs in recognition between the terminal apparatus 200 and the base station 100), there is the possibility that a problem may occur.

In contrast, for example, by applying the CBG index recognition means indicated as the working example 1-4, it becomes possible for the base station 100 to recognize that, in the case where a CBG transmitted from the terminal apparatus 200 is not correct, the CBG is not a correct CBG. On the other hand, the terminal apparatus 200 side has no means for recognizing that an erroneous CBG is transmitted. Therefore, in addition to the technology described in connection with the present working example, a contrivance becomes required by which, for example, in the case where the base station 100 recognizes that the CBG is not a correct CBG, notification of information according to the result of the recognition is issued to the terminal apparatus 200.

Working Example 5-3: Transmission of all CBG Re-Transmission Request

Now, an example of a technology for improving the system according to the working example 5-2 described above is described as the working example 5-3. In the present working example, the base station 100 transmits a re-transmission request for all CBGs included in a TB to the terminal apparatus 200 as occasion demands.

As a particular example, it is assumed that CBG #2 and CBG #3 correspond to NACK in first time transmission. In this case, the base station 100 feeds back ACK in regard to CBG #0 and CBG #1 and feeds back NACK in regard to CBG #2 and CBG #3 to the terminal apparatus 200.

On the other hand, it is assumed that, although the terminal apparatus 200 succeeds in decoding itself of an HARQ-ACK feedback, an error occurs in a decoding result and it is recognized by the terminal apparatus 200 that CBG #0 and CBG #2 correspond to ACK and CBG #1 and CBG #3 correspond to NACK. In this case, the terminal apparatus 200 re-transmits CBG #1 and CBG #3.

In response to this, the base station 100 recognizes that CBGs that are not correct are transmitted, for example, using the CBG index recognition means described hereinabove in the description of the working example 1-4. Thereafter, the base station 100 notifies the terminal apparatus 200 of a re-transmission request for all CBGs. This makes it possible for the terminal apparatus 200 to transmit correct CBGs.

It is to be noted that the re-transmission request for all CBGs may be transmitted in addition to the HARQ-ACK feedback or may be transmitted in place of the HARQ-ACK feedback.

Working Example 5-4: Where HARQ-ACK is not Transmitted and Substituted by Other Information Subsequently, an example of a case in which the base station 100 does not transmit an HARQ-ACK feedback to the terminal apparatus 200 but substitutes other information is described as the working example 5-4. In particular, the base station 100 may use the NDI or CBG Index described hereinabove in substitution for an HARQ-ACK feedback. It is to be noted that operation of the base station 100 and the terminal apparatus 200 in this case is substantially similar to the operation indicated by the working example 4-2 or the working example 4-3.

<2.7. Supplement>

Although working examples in the case of a downlink and an uplink are described above, the technology according to the present disclosure described above as working examples is not necessarily limited only to a downlink and an uplink. As a particular example, the technology according to the present disclosure can be applied also to a side link such as Device to Device, communication with a relay terminal, Grant-free transmission for which Grant from a base station is not perform and so forth. Further, although the foregoing description is directed to the working examples in which an index of a CBG is notified, not only an index of a CBG, but also other information relating to a CB or a CBG such as a maximum size of a CBG, a number of CBs included in one CBG and so froth may be notified. Further, such notified information as described above may be utilized for notification use of other information in response to a situation.

Further, in the working examples described above, also application in 2-stage DCI is possible. In 2-Stage DCI, DCI of 1st stage includes minimum necessary control information and resource information of 2nd stage DCI, and 2nd stage DCI includes the remaining control information. In addition to the application of the working examples described above, in the case of 2-stage DCI, 1st stage DCI includes resource information of 2nd stage DCI. Therefore, by adjusting the resource size of 2nd stage DCI, also in the case where the maximum number of CBG indices dynamically changes over, it is possible to suppress transmission of wasteful bits that have no information.

3. Application Example

The technology according to the present disclosure can be applied to various products. For example, the base station 100 may be implemented as an eNB (evolved Node B) of any one of kinds of a macro eNB, a small eNB or so forth. The small eNB may be an eNB that covers cells smaller than macro cells such as a pico eNB, a micro eNB or a home (femt) eNB. Instead, the base station 100 may be implemented as a base station of some other type such as NodeB or BTS (Base Transceiver Station). The base station 100 may include a body for controlling wireless communication (also called base station apparatus) and one or more RRHs (Remote Radio Heads) located at a place different from that of the body. Further, various kinds of terminals hereinafter described may temporarily or semi-permanently execute base station functions so as to operate as the base station 100. Furthermore, at least some of components of the base station 100 may be implemented by a base station apparatus or a module for a base station apparatus.

Further, for example, the terminal apparatus 200 may be implemented as a smartphone, a tablet PC (Personal Computer), a notebook PC, a portable game terminal, a mobile terminal such as a mobile router of the portable type/dongle type or a digital camera, or a vehicle-carried terminal such as a car navigation apparatus. Further, the terminal apparatus 200 may be implemented as a terminal that performs M2M (Machine to Machine) communication (also called MTC (Machine Type Communication) terminal). Further, the terminal apparatus 200 may be implemented as a so-called low-cost terminal such as an MTC terminal, an eMTC terminal or an NB-IoT terminal. Furthermore, at least part of components of the terminal apparatus 200 may be implemented as a module incorporated in such terminals as described above (for example, an integrated circuit module configured from one die).

<3.1. Application Example Relating to Base Station>

First Application Example

Figure 20:
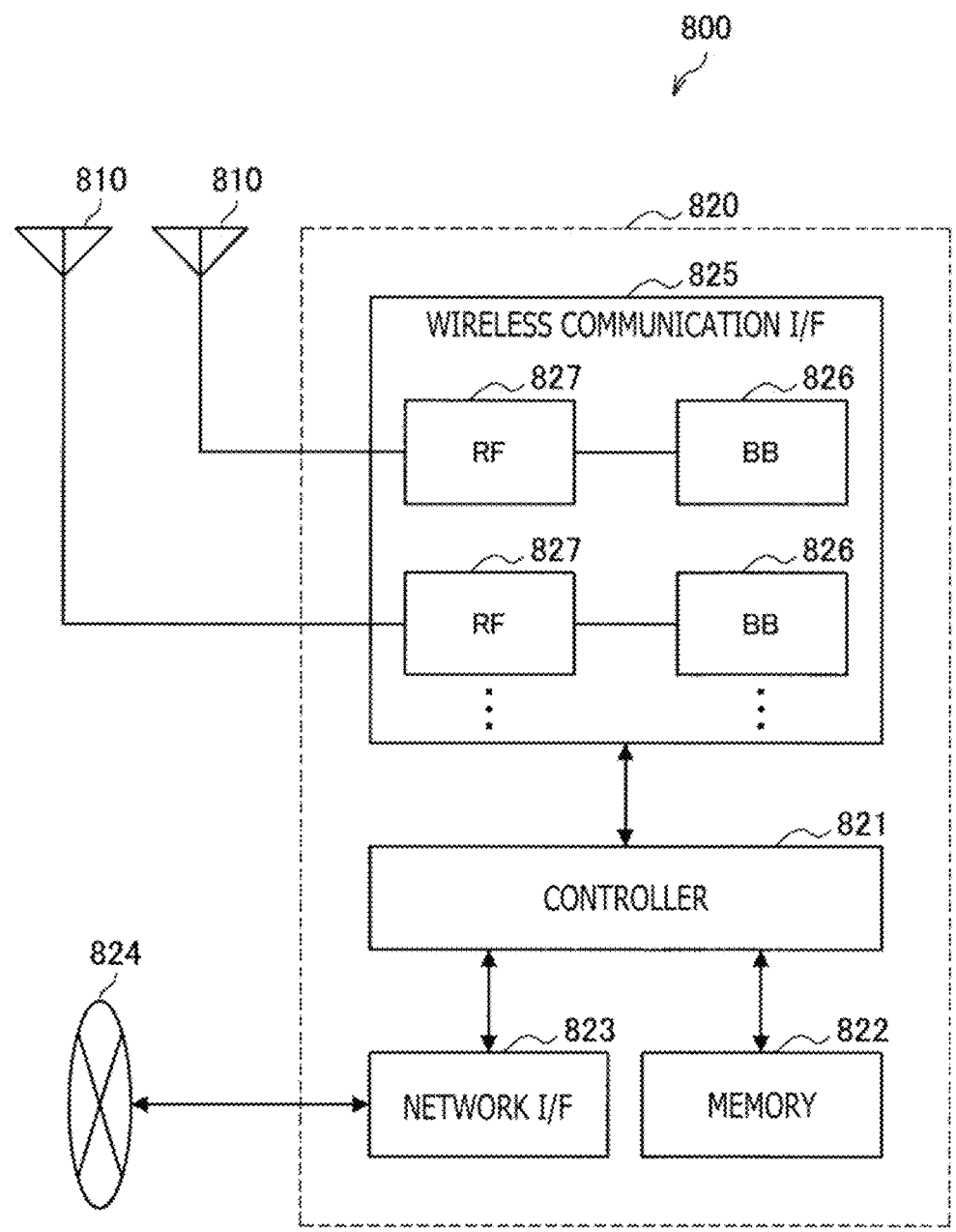
FIG. 20 is a block diagram depicting a first example of a schematic configuration of an eNB.

FIG. 20 is a block diagram depicting a first example of a schematic configuration of an eNB to which the technology according to the present disclosure can be applied. The eNB 800 includes one or more antennae 810 and a base station apparatus 820. Each antenna 810 and the base station apparatus 820 can be connected to each other through an RF cable.

Each of the antennae 810 includes a single or a plurality of antenna elements (for example, a plurality of antenna elements configuring a MIMO antenna) and is used for transmission and reception of a wireless signal by the base station apparatus 820. The eNB 800 includes a plurality of antennae 810 as depicted in FIG. 20, and the plurality of antennae 810 may individually correspond, for example, to a plurality of frequency bands used by the eNB 800. It is to be noted that, although FIG. 20 depicts an example in which the eNB 800 includes a plurality of antennae 810, the eNB 800 may otherwise include a single antenna 810.

The base station apparatus 820 includes a controller 821, a memory 822, a network interface 823 and a wireless communication interface 825.

The controller 821 may be, for example, a CPU or a DSP and causes various functions of an upper layer of the base station apparatus 820 to operate. For example, the controller 821 generates a data packet from data in a signal processed by the wireless communication interface 825 and transfers the generated packet through the network interface 823. The controller 821 may bundle data from a plurality of baseband processors to generate a bundled packet and transfer the generated bundled packet. Further, the controller 821 may have logical functions for executing Radio Resource Control, Radio Bearer Control, Mobility Management, Admission Control or control for scheduling. Further, the control may be executed in cooperation with a peripheral eNB or core network node. The memory 822 includes a RAM and a ROM and stores programs to be executed by the controller 821 and various control data (for example, a terminal list, transmission power data, scheduling data and so forth).

The network interface 823 is a communication interface for connecting the base station apparatus 820 to a core network 824. The controller 821 may communicate with the core network node or a different eNB through the network interface 823. In this case, the eNB 800 and the core network node or different eNB may be connected to each other by a logical interface (for example, a S1 interface or an X2 interface). The network interface 823 may be a wire communication interface or a wireless communication interface for wireless backhaul. In the case where the network interface 823 is a wireless communication interface, the network interface 823 may use a frequency band higher than a frequency band used by the wireless communication interface 825 for wireless communication.

The wireless communication interface 825 supports a cellular communication method that is any one of LTE (Long Term Evolution), LTE-Advanced or so forth and provides wireless connection to a terminal positioned in the cell of the eNB 800 through the antenna 810. The wireless communication interface 825 can typically include a baseband (BB) processor 826, an RF circuit 827 and so forth. The BB processor 826 may perform, for example, encoding/decoding, modulation/demodulation, multiplexing/demultiplexing and so forth and execute various signal processes of layers (for example, L1, MAC (Medium Access Control), RLC (Radio Link Control) and PDCP (Packet Data Convergence Protocol)). The BB processor 826 may have part or all of the logical functions described above in place of the controller 821. The BB processor 826 may be a module that includes a memory for storing a communication controlling program, a processor for executing the program and related circuits, and the functions of the BB processor 826 may be changeable by updating of the program. Further, the module may be a card or a blade that is inserted into a slot of the base station apparatus 820 or a chip installed in the card or the blade. On the other hand, the RF circuit 827 may include a mixer, a filter, an amplifier and so forth and transmits and receives a wireless signal through the antenna 810.

The wireless communication interface 825 includes a plurality of BB processors 826 as depicted in FIG. 20, and the plurality of BB processors 826 may individually correspond, for example, to a plurality of frequency bands used by the eNB 800. Further, the wireless communication interface 825 includes a plurality of RF circuits 827 as depicted in FIG. 20, and the plurality of RF circuits 827 may individually correspond, for example, to a plurality of antenna elements. It is to be noted that, while FIG. 20 indicates an example in which the wireless communication interface 825 includes a plurality of BB processors 826 and a plurality of RF circuits 827, the wireless communication interface 825 may otherwise include a single BB processor 826 or a single RF circuit 827.

In the eNB 800 depicted in FIG. 20, one or more of the components included in the processing section 150 (at least any one of the communication controlling section 151, information acquisition section 153, decision section 155 or notification section 157) described hereinabove with reference to FIG. 2 may be incorporated in the wireless communication interface 825. As an alternative, at least some of the components mentioned may be incorporated in the controller 821. As an example, the eNB 800 may incorporate a module that includes part of the wireless communication interface 825 (for example, the BB processor 826) or the entire wireless communication interface 825 and/or the controller 821, and one or more of the components described above may be incorporated in the module. In this case, the module may store a program for causing the processor to function as the one or more components (in other words, a program for causing the processor to perform operation of the one or more components described above) and execute the program. As another example, a program for causing the processor to function as the one or more components may be installed in the eNB 800 and executed by the wireless communication interface 825 (for example, the BB processor 826) and/or the controller 821. As described above, the eNB 800, base station apparatus 820 or module described above may be provided as an apparatus that includes the one or more components as described above, and a program for causing the processor to function as the one or more components may be provided. Further, a readable recording medium in which the program is recorded may be provided.

Further, in the eNB 800 depicted in FIG. 20, the wireless communication section 120 described hereinabove with reference to FIG. 2 may be incorporated in the wireless communication interface 825 (for example, the RF circuit 827). Further, the antenna section 110 may be incorporated in the antenna 810. Further, the network communication section 130 may be incorporated in the controller 821 and/or the network interface 823. Further, the storage section 140 may be incorporated in the memory 822.

Second Application Example

Figure 21:
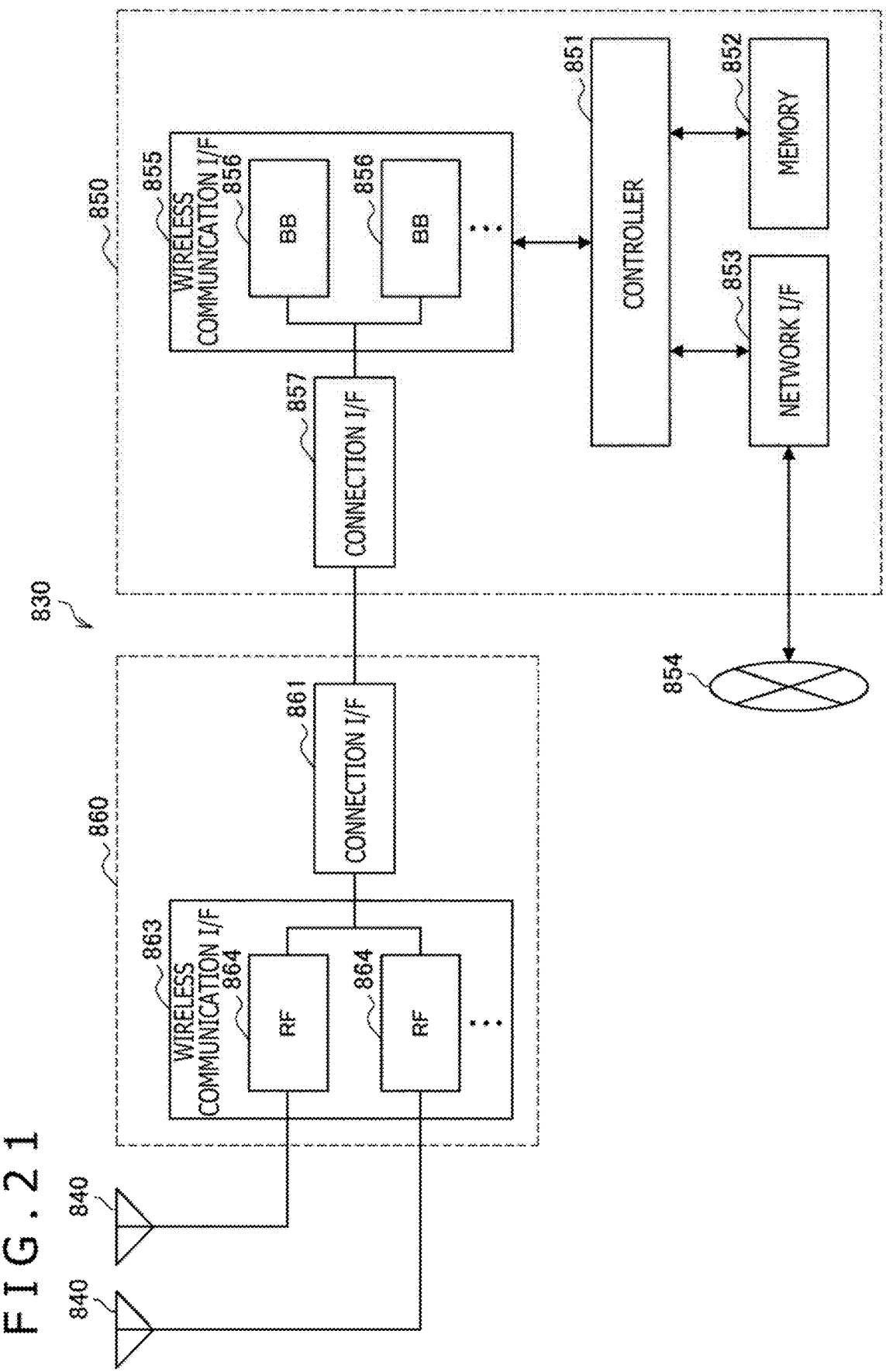
FIG. 21 is a block diagram depicting a second example of a schematic configuration of an eNB.

FIG. 21 is a block diagram depicting a second example of a schematic configuration of an eNB to which the technology according to the present disclosure can be applied. The eNB 830 includes one or more antennae 840, a base station apparatus 850 and an RRH 860. The antennae 840 and the RRH 860 can be connected to each other through an RF cable. Further, the base station apparatus 850 and the RRH 860 can be connected to each other by a high speed line such as an optical fiber cable.

Each of the antennae 840 includes a single or a plurality of antenna elements (for example, a plurality of antenna elements that configure a MIMO antenna) and is used for transmission and reception of a wireless signal by the RRH 860. The eNB 830 includes a plurality of antennae 840 as depicted in FIG. 21, and the plurality of antennae 840 may individually correspond to a plurality of frequency bands, for example, used by the eNB 830. It is to be noted that, although FIG. 21 depicts an example in which the eNB 830 includes a plurality of antennae 840, the eNB 830 may otherwise include a single antenna 840.

The base station apparatus 850 includes a controller 851, a memory 852, a network interface 853, a wireless communication interface 855 and a connection interface 857. The controller 851, memory 852 and network interface 853 are similar to the controller 821, memory 822 and network interface 823 described hereinabove with reference to FIG. 20.

The wireless communication interface 855 supports a cellular communication method that is any one of LTE, LTE-Advanced or so forth and provides wireless connection to a terminal positioned in a sector corresponding to the RRH 860 through the RRH 860 and the antenna 840. The wireless communication interface 855 can typically include a BB processor 856 and so forth. The BB processor 856 is similar to the BB processor 826 described hereinabove with reference to FIG. 20 except that it is connected to an RF circuit 864 of the RRH 860 through the connection interface 857. The wireless communication interface 855 includes a plurality of BB processors 856 as depicted in FIG. 20, and the plurality of BB processors 856 may individually correspond, for example, to a plurality of frequency bands used by the eNB 830. It is to be noted that, although FIG. 21 depicts an example in which the wireless communication interface 855 includes a plurality of BB processors 856, the wireless communication interface 855 may otherwise include a single BB processor 856.

The connection interface 857 is an interface for connecting the base station apparatus 850 (wireless communication interface 855) to the RRH 860. The connection interface 857 may otherwise be a communication module for communication by the high speed line that connects the base station apparatus 850 (wireless communication interface 855) and the RRH 860 to each other.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for the communication by the high speed line.

The wireless communication interface 863 transmits and receives a wireless signal through the antenna 840. The wireless communication interface 863 can typically include an RF circuit 864 and so forth. The RF circuit 864 may include a mixer, a filter, an amplifier and so forth and transmits and receives a wireless signal through the antenna 840. The wireless communication interface 863 includes a plurality of RF circuits 864 as depicted in FIG. 21, and the plurality of RF circuits 864 may individually correspond, for example, to the plurality of antenna elements. It is to be noted that, while FIG. 21 depicts an example in which the wireless communication interface 863 includes a plurality of RF circuits 864, the wireless communication interface 863 may otherwise include a single RF circuit 864.

In the eNB 830 depicted in FIG. 21, one or more of the components included in the processing section 150 described hereinabove with reference to FIG. 2 (at least any one of the communication controlling section 151, information acquisition section 153, decision section 155 or notification section 157) may be incorporated in the wireless communication interface 855 and/or the wireless communication interface 863. Otherwise, at least some of the components may be incorporated in the controller 851. As an example, the eNB 830 may have incorporated therein a module that includes part of the wireless communication interface 855 (for example, the BB processor 856) or the entire wireless communication interface 855 and/or the controller 851, and the one or more components described above may be incorporated in the module. In this case, the module may store therein a program for causing the processor to function as the one or more components (in other words, a program for causing the processor to execute operation of the one or more components) and execute the program. As another example, the program for causing the processor to function as the one or more components may be installed in the eNB 830 and may be executed by the wireless communication interface 855 (for example, the BB processor 856) and/or the controller 851. In this manner, the eNB 830, base station apparatus 850 or module described above may be provided as an apparatus that includes the one or more components, and the program for causing the processor to function as the one or more components may be provided. Further, a readable recording medium in which the program is recorded may be provided.

Further, in the eNB 830 depicted in FIG. 21, for example, the wireless communication section 120 described hereinabove with reference to FIG. 2 may be incorporated in the wireless communication interface 863 (for example, the RF circuit 864). Further, the antenna section 110 may be incorporated in the antenna 840. Further, the network communication section 130 may be incorporated in the controller 851 and/or the network interface 853. Further, the storage section 140 may be incorporated in the memory 852.

<3.2. Application Example Relating to Terminal Apparatus>

First Application Example

Figure 22:
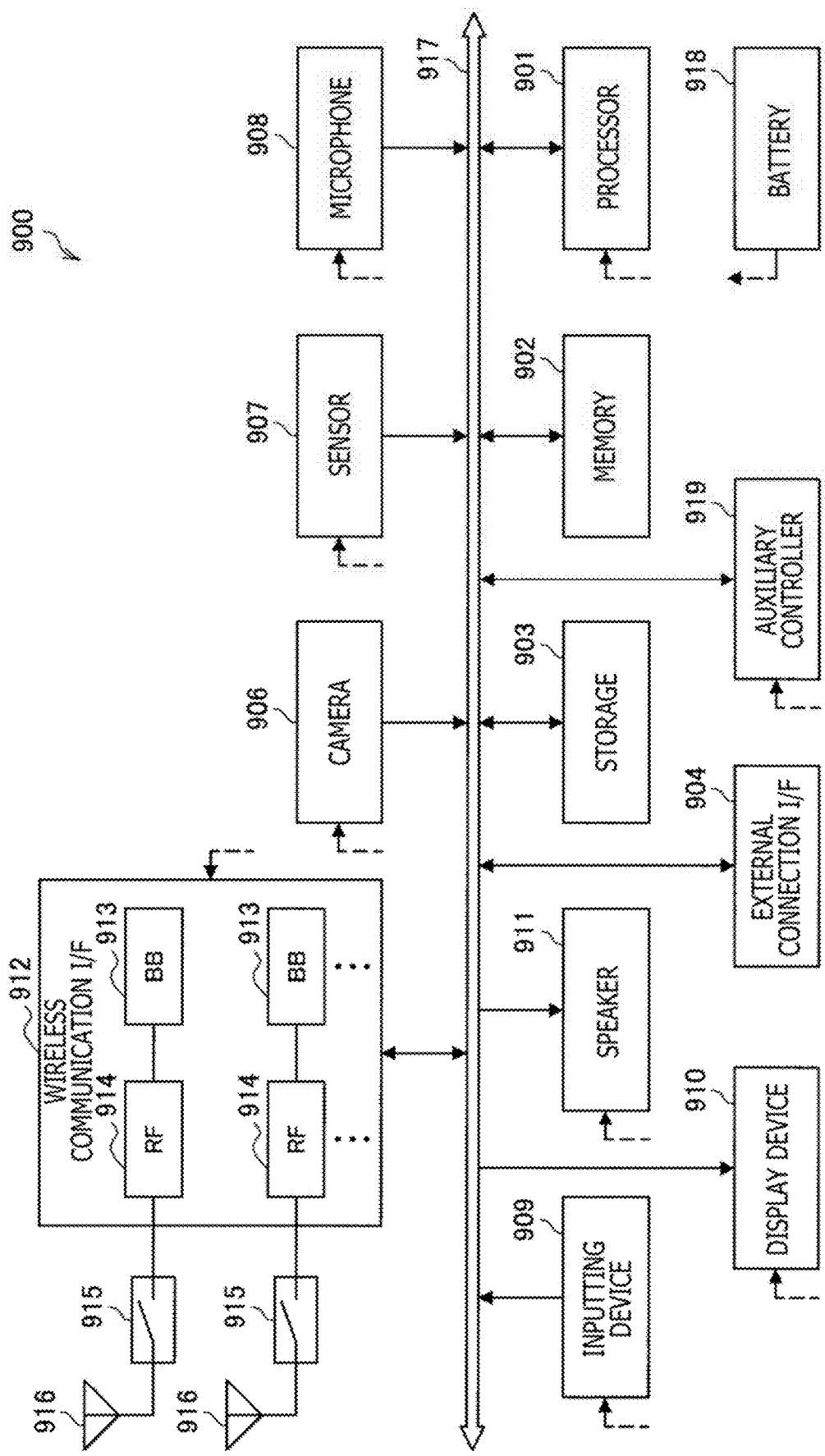
FIG. 22 is a block diagram depicting an example of a schematic configuration of a smartphone.

FIG. 22 is a block diagram depicting an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an inputting device 909, a display device 910, a speaker 911, a wireless communication interface 912, one or more antenna switches 915, one or more antennae 916, a bus 917, a battery 918 and an auxiliary controller 919.

The processor 901 may be, for example, a CPU or an SoC (System on Chip) and controls functions of the application layer and other layers of the smartphone 900. The memory 902 includes a RAM and a ROM and stores programs to be executed by the processor 901 and data. The storage 903 can include a storage medium such as a semiconductor memory or a hard disk. The external connection interface 904 is an interface for connecting an external device such as a memory card or a USB (Universal Serial Bus) to the smartphone 900.

The camera 906 includes an imaging element such as, for example, a CCD (Charge Coupled Device) element or CMOS (Complementary Metal Oxide Semiconductor) element and generates a captured image. The sensor 907 can include a sensor group such as, for example, a positioning sensor, a gyro sensor, a geomagnetic sensor, an acceleration sensor and so forth. The microphone 908 converts sound inputted to the smartphone 900 into a sound signal. The inputting device 909 includes, for example, a touch sensor for detecting a touch with the screen of the display device 910, a keypad, a keyboard, a button, a switch or the like and accepts an operation or an information input from a user. The display device 910 includes a screen of a liquid crystal display (LCD) or an organic light emission diode (OLED) display and displays an output image of the smartphone 900. The speaker 911 converts a sound signal outputted from the smartphone 900 into sound.

The wireless communication interface 912 supports a cellular communication method such that is any one of LTE, LTE-Advanced or so forth and executes wireless communication. The wireless communication interface 912 can typically include a BB processor 913, an RF circuit 914 and so forth. The BB processor 913 may perform, for example, encoding/decoding, modulation/demodulation, multiplexing/demultiplexing and so forth and executes various signal processes for wireless communication. On the other hand, the RF circuit 914 may include a mixer, a filter, an amplifier and so forth and transmits and receives a wireless signal through the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as depicted in FIG. 22. It is to be noted that, while FIG. 22 depicts an example in which the wireless communication interface 912 includes a plurality of BB processors 913 and a plurality of RF circuits 914, the wireless communication interface 912 may otherwise include a single BB processor 913 and a single RF circuit 914.

Further, the wireless communication interface 912 may support a wireless communication method of a different type such as a short-range wireless communication method, a proximity wireless communication method or a wireless LAN (Local Area Network) method in addition to the cellular communication method, and may include, in this case, a BB processor 913 and an RF circuit 914 for each wireless communication method.

Each of the antenna switches 915 changes over the connection destination of the antenna 916 among a plurality of circuits included in the wireless communication interface 912 (for example, among circuits for different wireless communication methods).

Each of the antennae 916 includes a single or a plurality of antenna elements (for example, a plurality of antenna elements configuring a MIMO antenna) and is used for transmission and reception of a wireless signal by the wireless communication interface 912. The smartphone 900 may include a plurality of antennae 916 as depicted in FIG. 22. It is to be noted that, although FIG. 22 depicts an example in which the smartphone 900 includes a plurality of antennae 916, the smartphone 900 may otherwise include a single antenna 916.

Further, the smartphone 900 may include an antenna 916 for each wireless communication method. In this case, the antenna switch 915 may be omitted from the configuration of the smartphone 900.

The bus 917 connects the processor 901, memory 902, storage 903, external connection interface 904, camera 906, sensor 907, microphone 908, inputting device 909, display device 910, speaker 911, wireless communication interface 912 and auxiliary controller 919 to each other. The battery 918 supplies power to the blocks of the smartphone 900 depicted in FIG. 22 through a feed line indicated partly by a broken line in FIG. 22. The auxiliary controller 919 causes minimum necessary functions of the smartphone 900 to operate, for example, in a sleep mode.

In the smartphone 900 depicted in FIG. 22, one or more of the components included in the processing section 240 described hereinabove with reference to FIG. 3 (at least any one of the communication controlling section 241, information acquisition section 243, decision section 245 or notification section 247) may be incorporated in the wireless communication interface 912. Otherwise, at least some of the components may be incorporated in the processor 901 or the auxiliary controller 919. As an example, the smartphone 900 may incorporate a module that includes part of the wireless communication interface 912 (for example, the BB processor 913) or the entire wireless communication interface 912, the processor 901 and/or the auxiliary controller 919, and the one or more components described above may be incorporated in the module. In this case, the module may store a program for causing the processor to function as the one or more components (in other words, a program for causing the processor to execute operation of the one or more components) and execute the program. As another example, the program for causing the processor to function as the one or more components may be installed in the smartphone 900 and executed by the wireless communication interface 912 (for example, the BB processor 913), processor 901 and/or auxiliary controller 919. In this manner, the smartphone 900 or the module may be provided as an apparatus that includes the one or more components, and a program for causing the processor to function as the one or more components may be provided. Further, a readable recording medium in which the program is recorded may be provided.

Further, in the smartphone 900 depicted in FIG. 22, for example, the wireless communication section 220 described hereinabove with reference to FIG. 3 may be incorporated in the wireless communication interface 912 (for example, the RF circuit 914). Further, the antenna section 210 may be incorporated in the antenna 916. Further, the storage section 230 may be incorporated in the memory 902.

Second Application Example

Figure 23:
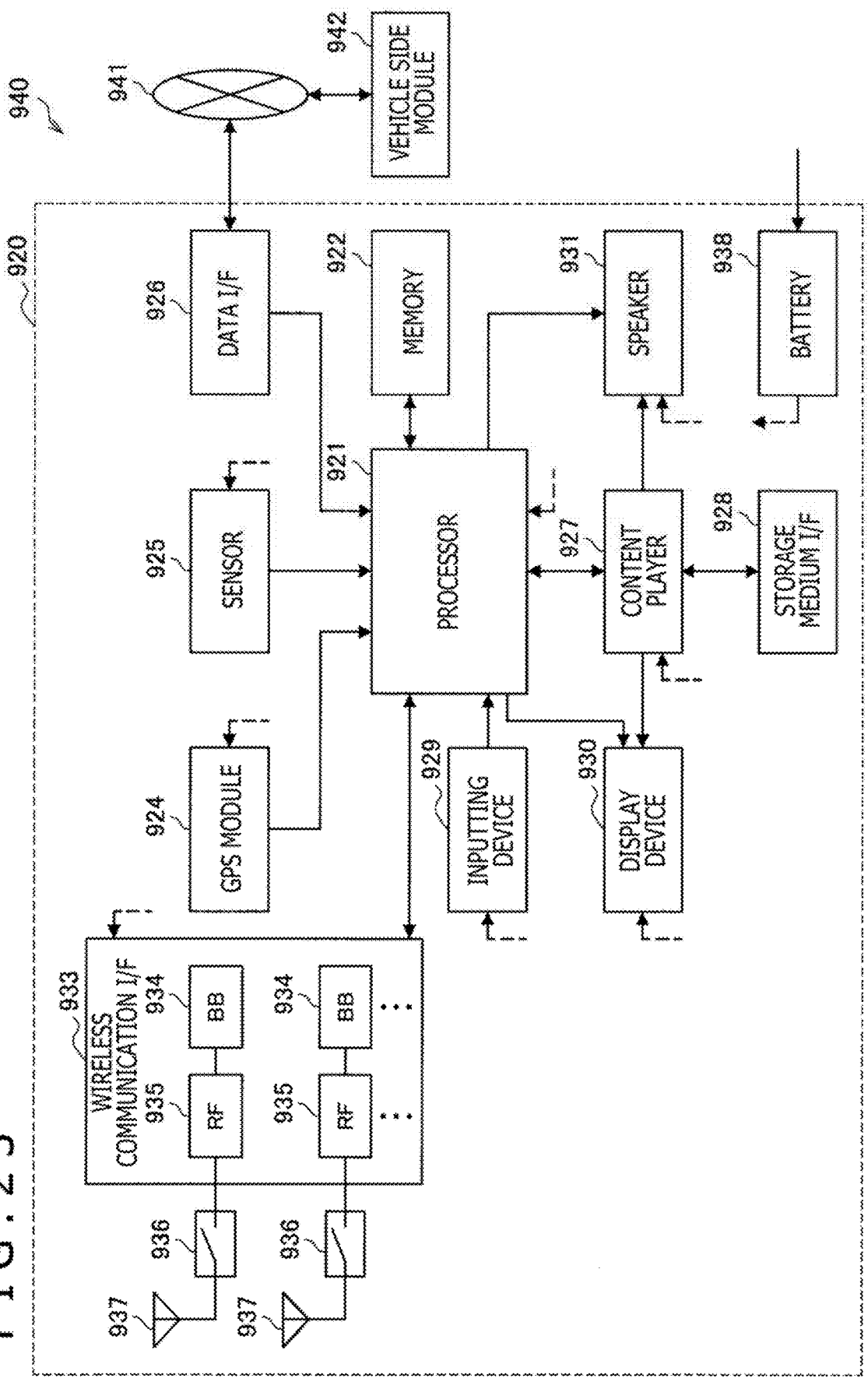
FIG. 23 is a block diagram depicting an example of a schematic configuration of a car navigation apparatus.

FIG. 23 is a block diagram depicting an example of a schematic configuration of a car navigation apparatus 920 to which the technology according to the present disclosure can be applied. The car navigation apparatus 920 includes a processor 921, a memory 922, a GPS (Global Positioning System) module 924, a sensor 925, a data interface 926, a content player 927, a storage medium interface 928, an inputting device 929, a display device 930, a speaker 931, a wireless communication interface 933, one or more antenna switches 936, one or more antennae 937 and a battery 938.

The processor 921 may be, for example, a CPU or an SoC and controls a navigation function and other functions of the car navigation apparatus 920. The memory 922 includes a RAM and a ROM and stores a program to be executed by the processor 921 and data.

The GPS module 924 measures the position (for example, the latitude, longitude and altitude) of the car navigation apparatus 920 using GPS signals received from GPS satellites. The sensor 925 can include a sensor group of, for example, a gyro sensor, a geomagnetic sensor and a barometric pressure sensor. The data interface 926 is connected to an in-vehicle network 941, for example, through a terminal not depicted and acquires data generated on the vehicle side such as vehicle speed data.

The content player 927 reproduces a content stored in a storage medium (for example, a CD or a DVD) inserted in the storage medium interface 928. The inputting device 929 includes, for example, a touch sensor for detecting a touch with the screen of the display device 930, a button or a switch and accepts an operation or an information input from a user. The display device 930 has a screen of an LCD or OLED display or the like and displays an image of the navigation function or a content reproduced. The speaker 931 outputs sound of the navigation function or a reproduced content.

The wireless communication interface 933 supports a cellular communication method that is any one of LTE, LTE-advanced or so forth and executes wireless communication. The wireless communication interface 933 can typically include a BB processor 934, an RF circuit 935 and so forth. The BB processor 934 may perform, for example, encoding/decoding, modulation/demodulation, multiplexing/demultiplexing and so forth and executes various signal processes for wireless communication. Meanwhile, the RF circuit 935 may include a mixer, a filter, an amplifier and so forth and transmits and receives a wireless signal through the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as depicted in FIG. 23. It is to be noted that, while FIG. 23 depicts an example in which the wireless communication interface 933 includes a plurality of BB processors 934 and a plurality of RF circuits 935, the wireless communication interface 933 may otherwise include a single BB processor 934 or a single RF circuit 935.

Further, the wireless communication interface 933 may support a wireless communication method of a different type such as a short-range wireless communication method, a proximity wireless communication method or a wireless LAN method in addition to the cellular communication method, and may include, in this case, a BB processor 934 and an RF circuit 935 for each wireless communication method.

Each of the antenna switches 936 changes over the connection destination of the antenna 937 among a plurality of circuits included in the wireless communication interface 933 (for example, among circuits for different wireless communication methods).

Each of the antennae 937 includes a single or a plurality of antenna elements (for example, a plurality of antenna elements configuring a MIMO antenna) and is used for transmission and reception of a wireless signal by the wireless communication interface 933. The car navigation apparatus 920 may include a plurality of antennae 937 as depicted in FIG. 23. It is to be noted that, although FIG. 23 depicts an example in which the car navigation apparatus 920 includes a plurality of antennae 937, the car navigation apparatus 920 may otherwise include a single antenna 937.

Furthermore, the car navigation apparatus 920 may include an antenna 937 for each wireless communication method. In this case, the antenna switches 936 may be omitted from the configuration of the car navigation apparatus 920.

The battery 938 supplies electric power to the blocks of the car navigation apparatus 920 depicted in FIG. 23 through a feed line partly indicated by a broken line in FIG. 23. Further, the battery 938 accumulates power fed from the vehicle side.

In the car navigation apparatus 920 depicted in FIG. 23, one or more of the components included in the processing section 240 described hereinabove with reference to FIG. 3 (at least any one of the communication controlling section 241, information acquisition section 243, decision section 245 or notification section 247) may be incorporated in the wireless communication interface 933. Alternatively, at least some of the components may be incorporated in the processor 921. As an example, the car navigation apparatus 920 may incorporate a module that incorporates part of the wireless communication interface 933 (for example, the BB processor 934) or the entire wireless communication interface 933 and/or the processor 921, and the one or more components may be incorporated in the module. In this case, the module may store therein a program for causing the processor to function as the one or more components (in other words, a program for causing the processor to execute operation of the one or more components) and execute the program. As another example, a program for causing the processor to function as the one or more components may be installed in the car navigation apparatus 920 and executed by the wireless communication interface 933 (for example, the BB processor 934) and/or the processor 921. In this manner, the car navigation apparatus 920 or the module described above may be provided as an apparatus that includes the one or more components, and a program for causing the processor to function as the one or more components may be provided. Further, a readable recording medium in which the program is recorded may be provided.

Further, in the car navigation apparatus 920 depicted in FIG. 23, for example, the wireless communication section 220 described hereinabove with reference to FIG. 3 may be incorporated in the wireless communication interface 933 (for example, the RF circuit 935). Further, the antenna section 210 may be incorporated in the antenna 937. Further, the storage section 230 may be incorporated in the memory 922.

Further, the technology according to the present disclosure may be implemented as an in-vehicle system (or vehicle) 940 including one or more blocks of the car navigation apparatus 920 described hereinabove, an in-vehicle network 941 and a vehicle side module 942. In particular, the in-vehicle system (or vehicle) 940 may be provided as an apparatus that includes at least any one of the communication controlling section 241, information acquisition section 243, decision section 245 or notification section 247. The vehicle side module 942 generates vehicle side data of a vehicle speed, an engine speed or failure information and outputs the generated data to the in-vehicle network 941.

4. Conclusion

As described above, in the system according to the present embodiment, the base station 100 may notify the terminal apparatus 200 of information according to any of CBGs which the terminal apparatus 200 fails to receive (decode) from among one or more CBGs included in a TB, all CBGs included in the TB and CBGs to be made a target of re-transmission. By such a configuration as just described, also in the case where the base station 100 cannot detect an error of an HARQ-ACK feedback or in the case where the base station 100 fails to detect an error, a discrepancy in recognition of CBGs between the base station 100 and the terminal apparatus 200 can be eliminated.

Further, in the system according to the present embodiment, in the case where the base station 100 is to re-transmit at least part of the CBGs included in the TB to the terminal apparatus 200, the base station 100 may notify the terminal apparatus 200 of information for allowing the terminal apparatus 200 to specify CBGs that are to become a target of re-transmission. At this time, the base station 100 performs such a process as scramble or interleave for information associated with the CBGs that become a target of re-transmission (for example, a CRC for a CB included in the CBG, the CB itself or a CRC for the CBG) on the basis of information relating to the CBG (for example, an index). By such a configuration as just described, information for allowing the terminal apparatus 200 to specify CBGs that become a target of re-transmission is notified indirectly from the base station 100 to the terminal apparatus 200. By such a configuration as just described, also in the case where the base station 100 cannot detect an error of an HARQ-ACK feedback or in the case where the base station 100 fails to detect an error, a discrepancy in recognition of CBGs between the base station 100 and the terminal apparatus 200 can be eliminated. It is to be noted that the foregoing applies similarly also to a case in which the terminal apparatus 200 re-transmits a CBG to the base station 100.

Further, in the system according to the present embodiment, in the case where at least part of CBGs included in a TB are transmitted (re-transmitted) from the base station 100, the terminal apparatus 200 transmits, determining at least the part of transmitted CBGs as a target, an HARQ-ACK feedback according to a result of reception of each CBG back to the base station 100. By such a configuration as just described, upon re-transmission, the bit number of the HARQ-ACK feedback decreases, and the information amount of control information can be reduced. It is to be noted that the foregoing applies similarly also to a case in which the base station 100 transmits back an HARQ-ACK feedback to the terminal apparatus 200.

In this manner, with the system according to the embodiment of the present disclosure, also under an environment in which a technology relating to CBGs or CBG-based HARQ-ACK is applied, a flexible design according to a use case is made possible, and it is possible to further improve the transmission efficiency of the overall system.

Although the preferred embodiment of the present disclosure has been described in detail with reference to the accompanying drawings, the technical scope of the present disclosure is not limited to such embodiment as described above. It is apparent that those who have common knowledge in the technical field of the present disclosure can conceive various alternations or modifications without departing from the technical scope described in the claims, and it is recognized that also they naturally belong to the technical scope of the present disclosure.

Further, the advantageous effects described in the present specification are merely descriptive and exemplary to the last and are not restrictive. In other words, the technology according to the present disclosure can achieve other advantageous effects that are apparent to those skilled in the art from the description of the present specification in addition to the advantageous effects described above or in place of the advantageous effects described above.

It is to be noted that also such configurations as described below belong to the technical scope of the present disclosure.

(1)

A communication apparatus, including:

a communication section configured to perform wireless communication; and a control section configured to control such that information corresponding to a plurality of one-encoding units to be made a target of re-transmission is notified to another apparatus, the target of re-transmission being, from among one or a plurality of one-encoding units defined so as to include at least part of a plurality of one-encoding units included in a predetermined transmission unit, any of the plurality of one-encoding units whose reception results in failure and all of the plurality of one-encoding units included in the predetermined transmission unit.

(2)

The communication apparatus according to (1) above, in which the control section controls, in response to a reply from the another apparatus to transmission of data to the another apparatus, such that any of the plurality of one-encoding units that the another apparatus fails to receive or all of the plurality of one-encoding units included in the predetermined transmission unit are re-transmitted to the another apparatus, and controls such that the information according to a result of the control is notified to the another apparatus.

(3)

The communication apparatus according to (1) above, further including:

a decision section configured to decide a reception result of data transmitted from the another apparatus, in which the control section controls such that the information indicative of which one of the plurality of one-encoding units that the another apparatus fails to receive and all of the plurality of one-encoding units included in the predetermined transmission unit is to be made a target of re-transmission is notified to the another apparatus.

(4)

The communication apparatus according to (3) above, in which the another apparatus includes a terminal apparatus, and the control section controls such that the information is notified to the another apparatus in an associated relationship with information regarding allocation of a resource for allowing the another apparatus to transmit data.

(5)

The communication apparatus according to (4) above, in which the control section controls such that information regarding the plurality of one-encoding units allocated to transmission of new data from among the one or the plurality of one-encoding units included in the predetermined transmission unit is notified to the terminal apparatus.

(6)

The communication apparatus according to (4) above, in which the control section controls such that information indicative of the plurality of one-encoding units to be made a target of re-transmission from among the one or the plurality of one-encoding units included in the predetermined transmission unit is notified to the terminal apparatus.

(7)

A communication apparatus, including:

a communication section configured to perform wireless communication; and a control section configured to control, in response to a reply to transmission of data to another apparatus, such that at least part of a plurality of one-encoding units, from among one or a plurality of one-encoding units defined so as to include at least part of a plurality of one-encoding units included in a predetermined transmission unit, is re-transmitted to the another apparatus, in which the control section controls such that information for allowing the another apparatus to specify the plurality of one-encoding units to be made a target of re-transmission is notified to the another apparatus.

(8)

The communication apparatus according to (7) above, in which the control section performs, based on information regarding the plurality of one-encoding units to be made a target of re-transmission, a predetermined process for predetermined information associated with the plurality of one-encoding units, and controls such that the predetermined information for which the predetermined process is carried out is notified, as the information for specifying the plurality of one-encoding units, to the another apparatus.

(9)

The communication apparatus according to (8) above, in which the predetermined information includes an error detection code added to the plurality of one-encoding units to be made a target of re-transmission, an error detection code added to the one-encoding units included in the plurality of one-encoding units or the one-encoding units.

(10)

The communication apparatus according to (8) or (9) above, in which the predetermined process includes at least one of scramble or interleave.

(11)

The communication apparatus according to any one of (7) to (10) above, in which the another apparatus includes a terminal apparatus.

(12)

The communication apparatus according to any one of (7) to (10) above, in which the another apparatus includes a base station.

(13)

A communication apparatus, including:

a communication section configured to perform wireless communication; and a control section configured to control, targeting, from among one or a plurality of one-encoding units defined so as to include at least part of a plurality of one-encoding units included in a predetermined transmission unit, at least part of the plurality of one-encoding units transmitted from another apparatus, such that a reply according to a result of reception of the plurality of one-encoding units is notified to the another apparatus.

(14)

The communication apparatus according to (13) above, in which the control section controls, in response to a result of reception of at least part of the plurality of one-encoding units transmitted from the another apparatus, such that information regarding a transmission request for all of the plurality of one-encoding units included in the predetermined transmission unit is notified to the another apparatus.

(15)

The communication apparatus according to (13) above, in which the control section controls, in response to a result of reception of at least part of the plurality of one-encoding units transmitted from the another apparatus, such that information regarding the plurality of one-encoding units to be made a target of re-transmission is notified to the another apparatus.

(16)

The communication apparatus according to any one of (13) to (15) above, in which the another apparatus includes a terminal apparatus.

(17)

The communication apparatus according to any one of (13) to (15) above, in which the another apparatus includes a base station.

(18)

A communication method performed by a computer, including:

performing wireless communication; and controlling such that information regarding, from among one or a plurality of one-encoding units defined so as to include at least part of a plurality of one-encoding units included in a predetermined transmission unit, the plurality of one-encoding units to be made a target of re-transmission is notified to another apparatus.

(19)

A communication method performed by a computer, including:

performing wireless communication; and controlling, in response to a reply to transmission of data to another apparatus, such that at least part of a plurality of one-encoding units, from among one or a plurality of one-encoding units defined so as to include at least part of a plurality of one-encoding units included in a predetermined transmission unit, is re-transmitted to the another apparatus, in which information for allowing the another apparatus to specify the plurality of one-encoding units to be made a target of re-transmission is controlled so as to be notified to the another apparatus.

(20)

A communication method performed by a computer, including:

performing wireless communication; and controlling, targeting, from among one or a plurality of one-encoding units defined so as to include at least part of a plurality of one-encoding units included in a predetermined transmission unit, at least part of the plurality of one-encoding units transmitted from another apparatus, such that a reply according to a result of reception of the plurality of one-encoding units is notified to the another apparatus.

(21)

A communication apparatus, including:

a communication section configured to perform wireless communication; and an acquisition section configured to acquire information, from among one or a plurality of one-encoding units defined so as to include at least part of a plurality of one-encoding units included in a predetermined transmission unit, regarding the plurality of one-encoding units to be made a target of re-transmission.

REFERENCE SIGNS LIST

1 System
100 Base station
110 Antenna section
120 Wireless communication section
130 Network communication section
140 Storage section
150 Processing section
151 Communication controlling section
153 Information acquisition section
155 Decision section
157 Notification section
200 Terminal apparatus
210 Antenna section
220 Wireless communication section
230 Storage section
240 Processing section
241 Communication controlling section
243 Information acquisition section
245 Decision section
247 Notification section

The invention claimed is:

1. A communication apparatus, comprising:
communication circuitry configured to:
   transmit a transport block to another apparatus,
   wherein the transport block is divided into at least two encoding groups, each encoding group of the at least two encoding groups being formed of one or more encoding units,
   receive notification, from the another apparatus, regarding a target of re-transmission, the target of re-transmission being one or more encoding units not successfully received at the another apparatus, the one or more encoding units not successfully received corresponding to less than all of the at least two encoding groups, and
   based on a predetermined criteria, retransmit to the another apparatus either:
      a) only encoding groups of the at least two encoding groups that include the one of the one or more encoding units that the another apparatus fails to receive, or
      b) all of the one or more encoding units of the at least two encoding groups,
   wherein the predetermined criteria comprises information previously received from the another apparatus and indicating whether a) only encoding groups of the at least two encoding groups that include the one of the one or more encoding units that the another apparatus fails to receive are to be retransmitted to the another apparatus, or b) all of the one or more encoding units of the at least two encoding groups are to be retransmitted to the another apparatus.

2. The communication apparatus according to claim 1, wherein the information further includes an allocation of another one of the one or more encoding units for data transmission by the another apparatus.

3. The communication apparatus according to claim 1, wherein the information previously received from the another apparatus comprises quasi-static information indicating whether a) only encoding groups of the at least two encoding groups that include the one of the one or more encoding units that the another apparatus fails to receive are to be retransmitted to the another apparatus, or b) all of the one or more encoding units of the at least two encoding groups are to be retransmitted to the another apparatus.

4. A method performed by a communication apparatus, the method comprising:
   transmitting a transport block to another apparatus,
   wherein the transport block is divided into at least two encoding groups, each encoding group of the at least two encoding groups being formed of one or more encoding units,
   receiving notification, from the another apparatus, regarding a target of re-transmission, the target of re-transmission being one or more encoding units not successfully received at the another apparatus, the one or more encoding units not successfully received corresponding to less than all of the at least two encoding groups, and
   based on a predetermined criteria, retransmitting to the another apparatus either:
      a) only encoding groups of the at least two encoding groups that include the one of the one or more encoding units that the another apparatus fails to receive, or
      b) all of the one or more encoding units of the at least two encoding groups,
   wherein the predetermined criteria comprises information previously received from the another apparatus and indicating whether a) only encoding groups of the at least two encoding groups that include the one of the one or more encoding units that the another apparatus fails to receive are to be retransmitted to the another apparatus, or b) all of the one or more encoding units of the at least two encoding groups are to be retransmitted to the another apparatus.

5. The method according to claim 4, wherein the information further includes an allocation of another one of the one or more encoding units for data transmission by the another apparatus.

6. The method according to claim 4, wherein the information previously received from the another apparatus comprises quasi-static information indicating whether a) only encoding groups of the at least two encoding groups that include the one of the one or more encoding units that the another apparatus fails to receive are to be retransmitted to the another apparatus, or b) all of the one or more encoding units of the at least two encoding groups are to be retransmitted to the another apparatus.

7. A non-transitory computer-readable medium containing instructions to cause a communication apparatus to perform a method, the method comprising:
   transmitting a transport block to another apparatus,
   wherein the transport block is divided into at least two encoding groups, each encoding group of the at least two encoding groups being formed of one or more encoding units,
   receiving notification, from the another apparatus, regarding a target of re-transmission, the target of re-transmission being one or more encoding units not successfully received at the another apparatus, the one or more encoding units not successfully received corresponding to less than all of the at least two encoding groups, and
   based on a predetermined criteria, retransmitting to the another apparatus either:
      a) only encoding groups of the at least two encoding groups that include the one of the one or more encoding units that the another apparatus fails to receive, or
      b) all of the one or more encoding units of the at least two encoding groups, wherein the predetermined criteria comprises information previously received from the another apparatus and indicating whether a)

only encoding groups of the at least two encoding groups that include the one of the one or more encoding units that the another apparatus fails to receive are to be retransmitted to the another apparatus, or b) all of the one or more encoding units of the at least two encoding groups are to be retransmitted to the another apparatus.

8. The non-transitory computer-readable medium according to claim 7, wherein the information further includes an allocation of another one of the one or more encoding units for data transmission by the another apparatus.

9. The non-transitory computer-readable medium according to claim 7, wherein the information previously received from the another apparatus comprises quasi-static information indicating whether a) only encoding groups of the at least two encoding groups that include the one of the one or more encoding units that the another apparatus fails to receive are to be retransmitted to the another apparatus, or b) all of the one or more encoding units of the at least two encoding groups are to be retransmitted to the another apparatus.

\* \* \* \* \*